US012602709B2

(12) United States Patent
Hanson et al.

(10) Patent No.: US 12,602,709 B2
(45) Date of Patent: *Apr. 14, 2026

(54) DYNAMICALLY GENERATING AND SERVING CONTENT ACROSS DIFFERENT PLATFORMS

(71) Applicant: Target Brands, Inc., Minneapolis, MN (US)

(72) Inventors: Tyler Hanson, Stillwater, MN (US); Timothy Pekarna, Minneapolis, MN (US); Margaret Smith, Minneapolis, MN (US); Joseph Stano, Minneapolis, MN (US); Michael Weispfenning, Shakopee, MN (US); Michael Joyce, Hixson, TN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,588

(22) Filed: Sep. 9, 2024

(65) Prior Publication Data

US 2025/0086679 A1      Mar. 13, 2025

Related U.S. Application Data

(63) Continuation of application No. 18/464,644, filed on Sep. 11, 2023, now Pat. No. 12,112,355.

(51) Int. Cl.
| | |
|---|---|
| *G06Q 30/0242* | (2023.01) |
| *G06Q 30/0241* | (2023.01) |
| *G06Q 30/0251* | (2023.01) |
| *G06Q 30/0601* | (2023.01) |

(52) U.S. Cl.
CPC ..... *G06Q 30/0276* (2013.01); *G06Q 30/0267* (2013.01); *G06Q 30/0277* (2013.01); *G06Q 30/0601* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 8,700,470 B2 | 4/2014 | Chung et al. | |
| 9,665,556 B1 | 5/2017 | Sutariya et al. | |
| 10,204,316 B2 | 2/2019 | Muller et al. | |
| 10,909,580 B1 | 2/2021 | Krishnamurthy et al. | |

(Continued)

*Primary Examiner* — Vincent M Cao
(74) *Attorney, Agent, or Firm* — Barnes & Thornburg LLP

(57) ABSTRACT

A disclosed server system for dynamically generating and serving content for presentation across different channels can perform the following operations: receive a request from a client device for a subset of content elements, the request designating a desired channel for presenting content in a page, identify the subset having at least one content attribute that satisfies one or more subset creation criteria indicating a category identifier for a slot in a page template used for generating the page, dynamically generate the subset by: for each content element in the subset, dynamically adjusting presentation of the singular instance of the content element based on presentation requirements of the desired channel, the singular instance being commonly used across all device interface types, and serve the subset of the content elements to the client device, which includes the singular instances of the content elements dynamically adjusted for presentation in the desired channel.

20 Claims, 21 Drawing Sheets

(56)          References Cited

U.S. PATENT DOCUMENTS

| | | |
|---|---|---|
| 11,262,888  B1 | 3/2022 | Ferreyra et al. |
| 11,620,660  B2 | 4/2023 | Strutton et al. |
| 2004/0024652  A1 | 2/2004 | Buhse et al. |
| 2007/0150368  A1 | 6/2007 | Arora et al. |
| 2008/0319918  A1 | 12/2008 | Forlai |
| 2016/0291807  A1 | 10/2016 | Chong et al. |
| 2017/0236160  A1 | 8/2017 | Oberoi et al. |
| 2018/0189823  A1 | 7/2018 | Xie et al. |
| 2018/0315098  A1 | 11/2018 | Wang et al. |
| 2018/0357323  A1 | 12/2018 | Allen et al. |
| 2020/0233924  A1 | 7/2020 | George et al. |
| 2022/0155940  A1 | 5/2022 | Olbrich et al. |
| 2022/0374591  A1 | 11/2022 | Al Salami |

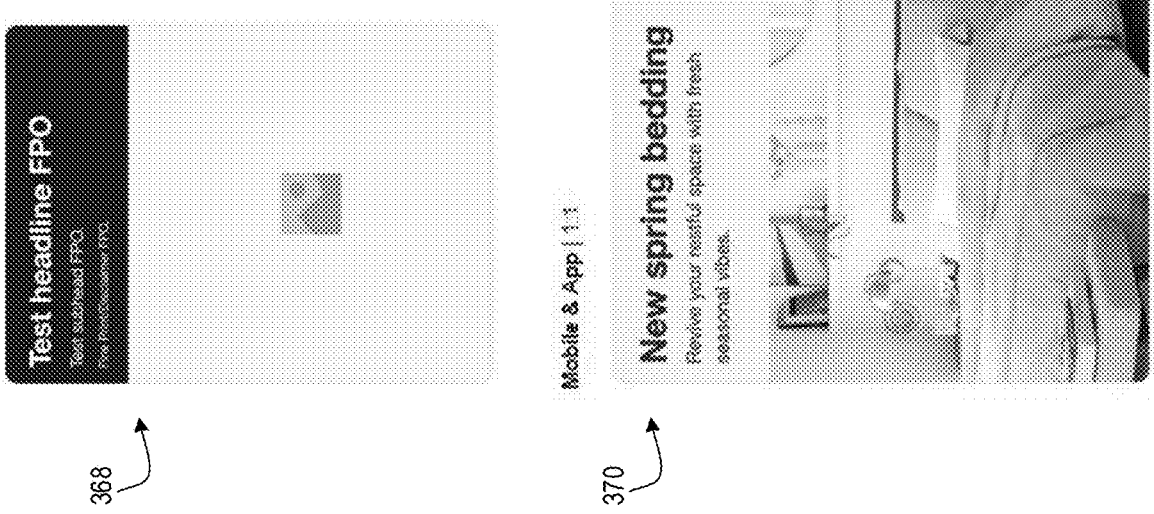
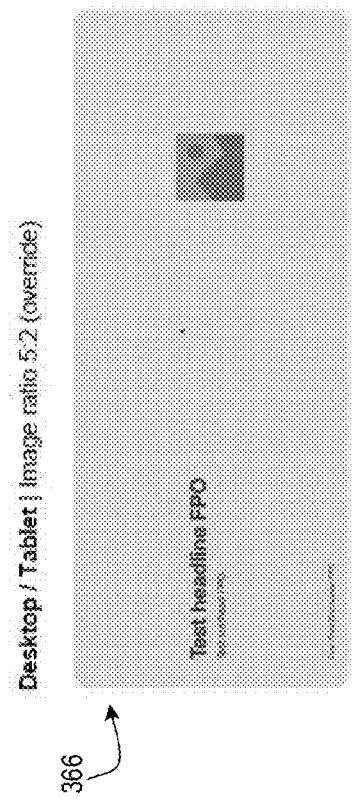
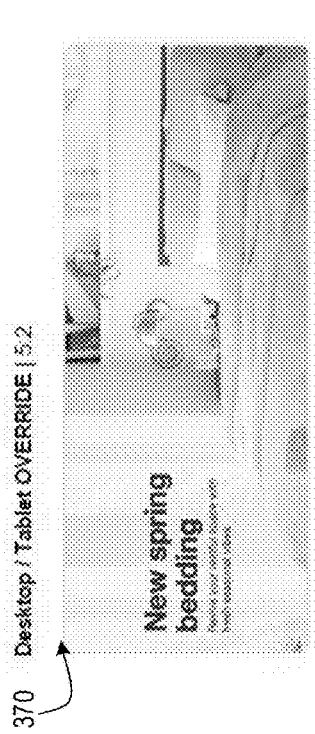
FIG. 3G

372

500

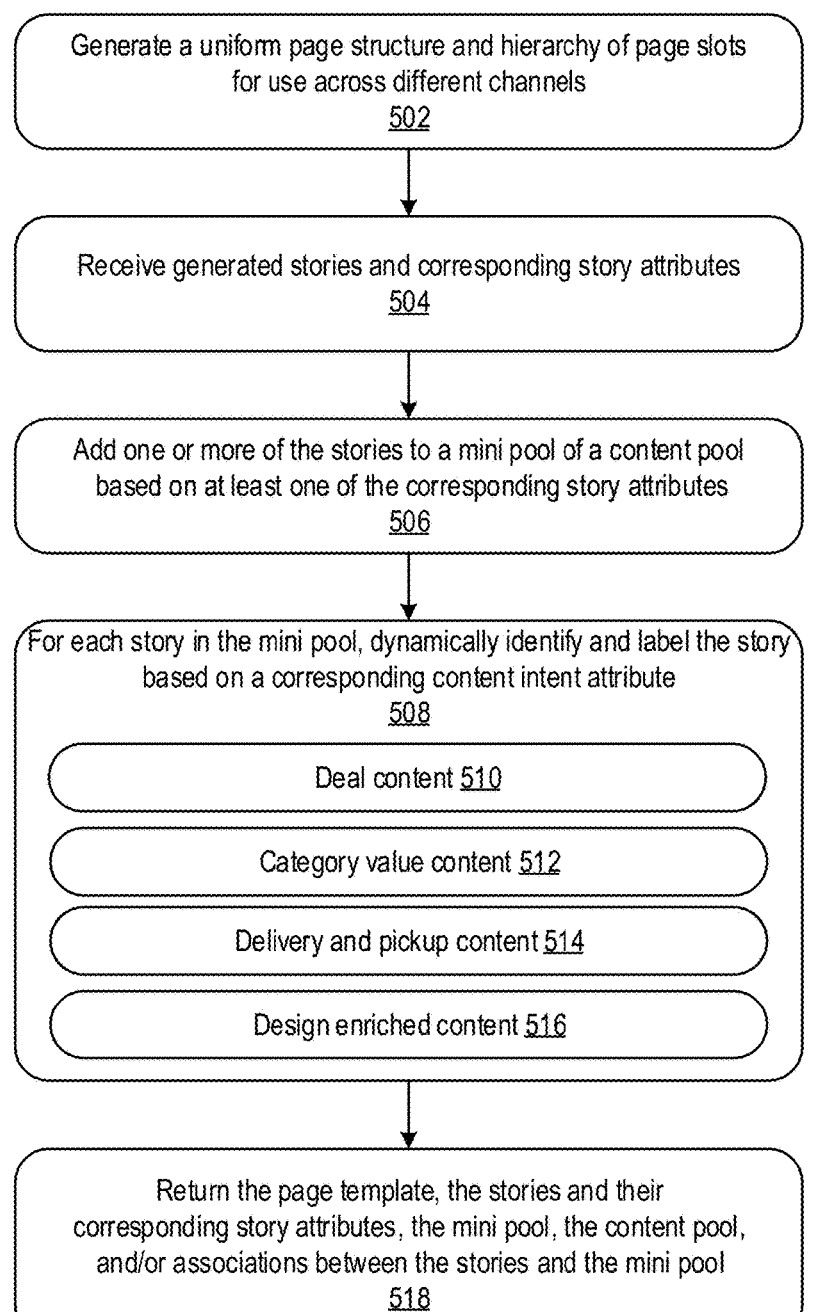

Generate a uniform page structure and hierarchy of page slots
for use across different channels
502

Receive generated stories and corresponding story attributes
504

Add one or more of the stories to a mini pool of a content pool
based on at least one of the corresponding story attributes
506

For each story in the mini pool, dynamically identify and label the story
based on a corresponding content intent attribute
508

Deal content 510

Category value content 512

Delivery and pickup content 514

Design enriched content 516

Return the page template, the stories and their
corresponding story attributes, the mini pool, the content pool,
and/or associations between the stories and the mini pool
518

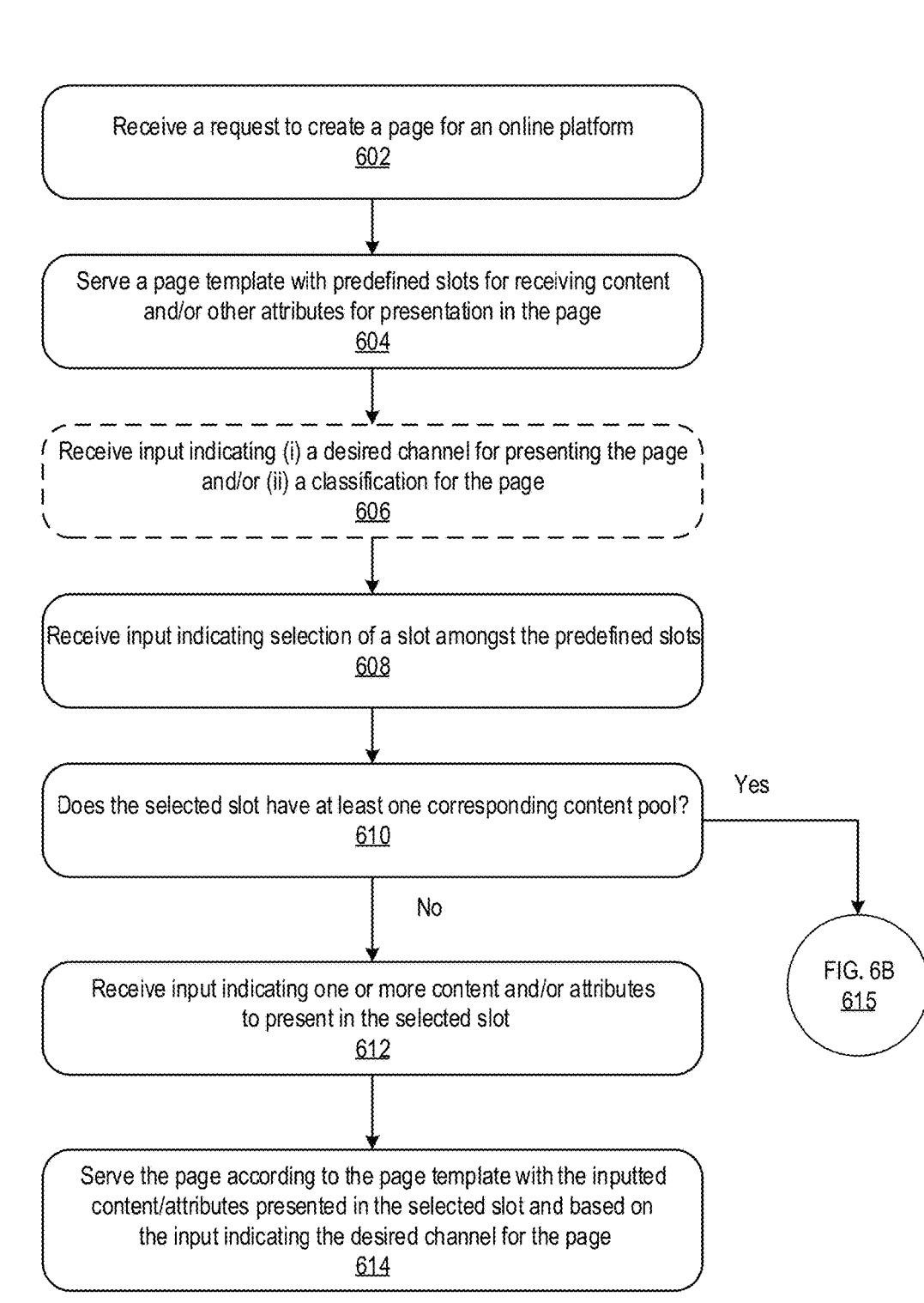

Receive a request to create a page for an online platform
602

Serve a page template with predefined slots for receiving content and/or other attributes for presentation in the page
604

Receive input indicating (i) a desired channel for presenting the page and/or (ii) a classification for the page
606

Receive input indicating selection of a slot amongst the predefined slots
608

Does the selected slot have at least one corresponding content pool?
610

Yes

Receive input indicating one or more content and/or attributes to present in the selected slot
612

Serve the page according to the page template with the inputted content/attributes presented in the selected slot and based on the input indicating the desired channel for the page
614

FIG. 6A

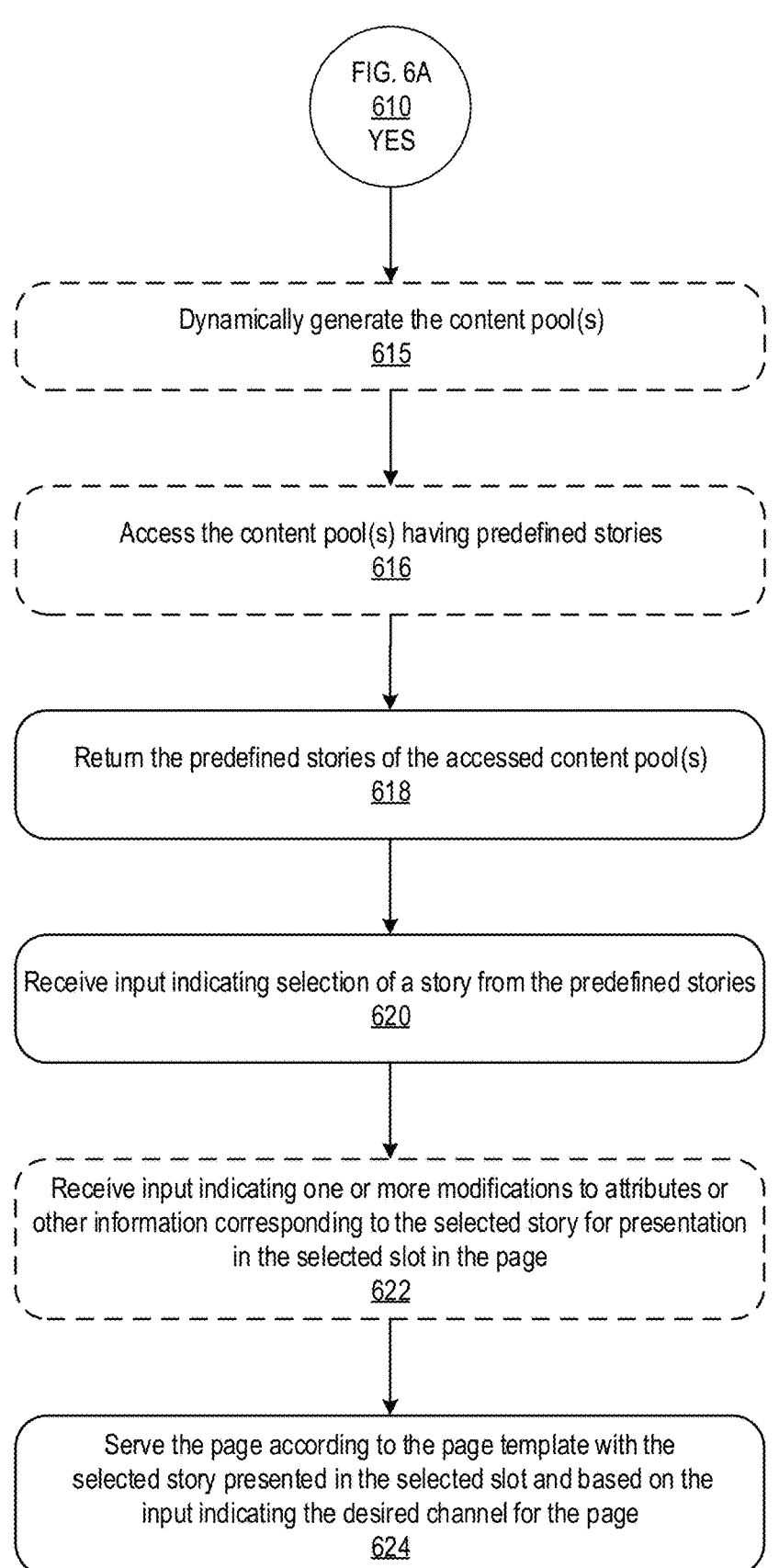

FIG. 6A
610
YES

Dynamically generate the content pool(s)
615

Access the content pool(s) having predefined stories
616

Return the predefined stories of the accessed content pool(s)
618

Receive input indicating selection of a story from the predefined stories
620

Receive input indicating one or more modifications to attributes or other information corresponding to the selected story for presentation in the selected slot in the page
622

Serve the page according to the page template with the selected story presented in the selected slot and based on the input indicating the desired channel for the page
624

DYNAMICALLY GENERATING AND SERVING CONTENT ACROSS DIFFERENT PLATFORMS

CROSS-REFERENCE TO RELATED APPLICATIONS

This application is a continuation of U.S. application Ser. No. 18/464,644, filed Sep. 11, 2023, which is incorporated herein in its entirety.

TECHNICAL FIELD

This document generally describes devices, systems, platforms, and methods related to dynamically generating, serving, and presenting content across multiple different platforms, such as desktop websites, mobile websites, and mobile applications, which can be in the context of an online retail environment.

BACKGROUND

Online platforms, including but not limited to online retail environments, blogs, stores, social media platforms, etc., can be developed for presentation in different types of channels, such as mobile applications, mobile websites, and/or desktop websites. Sometimes, content in an online retail environment can be adapted based on a designated channel for presentation. For example, relevant users can generate the content to be presented in a mobile application for mobile devices. The users can also adapt or otherwise generate the same content so that the content can be appropriately presented in a website via a browser of a desktop, mobile device, or computing device. For every desired channel for presentation, the users may modify the content so that the content can be appropriately presented based on requirements of that channel.

Content can be specifically curated and associated with a particular page in an online platform, such as an online retail environment. For example, sales, deals, or other promotional images/text/information can be generated for and associated with a page directed to women's clothing while different sales, deals, or other promotional information can be generated for and associated with a page directed to children's clothing. A user of the online retail environment may then select the content that has been specifically generated for and associated with the page that they are developing. Sometimes, a page may have limited or little content to select from. The user may generate their own content for the particular page and ensure that their generated content is adapted for presentation in a desired channel (e.g., mobile, web, desktop).

SUMMARY

The document generally describes systems, methods, platforms, and techniques for separating content from pages in an online platform, such as an online retail environment, and dynamically generating, serving, and presenting the same content elements in multiple different channels (e.g., webpage, application, or other type of page). The content can be maintained in a pool (e.g., the content can be stories maintained in a content pool) that allow for reusability and efficient serving of the content dynamically across (i) different channels for presentation and (ii) different structures, engines, and/or teams in an enterprise. The pool of content can permit for decoupling of content and pages/interfaces so that the two are not expressly linked to each other, which can permit for greater flexibility and efficiency in generating content and also in developing pages and interfaces in which the content will be presented. The disclosed technology can additionally permit for consistency across multiple different channels without having to specifically encode, place, or adapt the content for each of the different channels. Instead, the content can be created once and then maintained in a dynamically adaptive content pool to be served across any channel, without requiring the content to be generated multiple times to comply with formats/presentation requirements of any one channel.

More specifically, the disclosed technology can provide for setting up, storing, and readily querying and serving a pool of predefined and dynamically changing content for presentation across the different channels. Content can be generated, by relevant users who can be guided through providing content elements with graphics, text, and metadata that can be structured for use across multiple different channels without special adaptation or treatment by the users. The disclosed technology can provide for creating an amorphous and dynamic pool for which to add/maintain the generated content. The pool can be automatically modified over time, such as by adding content to the pool, modifying the content, removing content from the pool (e.g., expired content, such as an expired deal, sale, or promotion), and/or adjusting parameters of the pool. The amorphous nature of the content pool can allow for the relevant users to dynamically and efficiently generate pages in an online platform, such as an online retail environment, that can be presented across multiple different platforms.

A user, for example, can load a page template at a server system or other type of computer system, the page template having predefined slots for receiving information to present the in the page. The same page template can be used for developing different pages across the online retail environment. In some implementations, the page template can be dynamically and automatically modified over time using the disclosed technology. As a result, a content display in pages generated using the page template can dynamically change. The user can select one of the slots and be presented a pool of content from which to choose for populating the slot in the page template. Once the user selects the content that they desire to present in the page, the disclosed technology can automatically and dynamically adapt the selected content for presentation in the page according to a desired channel for presentation (e.g., mobile website, mobile application, desktop website, etc.). As a result, pages for the online retail environment can be efficiently and easily generated and served across the different channels for presentation. The user, in some examples, can be a creative, merchandiser, or other user who does not have a technical background. As a result, the user can be empowered to easily and efficiently author and manage content at scale without dependencies on technology teams, developers, or engineers.

The disclosed technology described herein provides a content delivery system that can enable digital messages to be reusable across different channels. One story can be generated then automatically and dynamically adapted for different presentations and/or different placements on pages presented across the different channels. Links, images, and/or copy can be entered into a story, which can then be displayed across the different channels in a variety of formats or outputs (e.g., presentations). Each story can be independent, even if it appear near other content pool stories or traditional components on a page. The stories can, in some implementations, be manually selected and placed/ presented across channels, including but not limited to applications, web, and/or web SLPs. Most relevant stories can also be delivered to relevant end users anywhere in their journey across a web, app, or other digital channel.

One or more embodiments described herein can include a server system for dynamically generating and serving content for presentation across different channels, the server system including: a data repository that can be configured to store a group of content elements and a page template, where: each of the group of content elements can include one or more visual content elements and one or more content attributes, the one or more visual content elements can be configured to be maintained in a single instance and visually presented according to different presentation requirements of different channels, the page template can include a group of predefined slots and parameters for presenting content in the group of predefined slots, the page template can be configured to be stored in a single instance and dynamically adjusted and served to a group of client computing devices in response to receiving a request from each of the group of client computing devices to generate at least one page for an online platform using the page template, and dynamically adjusting the page template can include automatically updating the parameters to present the page template in a user-designated device interface type. The system can also include a server system in data communication with the data repository, the server system being configured to: receive a request from a client computing device for a subset of the group of content elements in the data repository, the request designating a device interface type indicating a desired channel for presenting content in a page in an online platform, the designated device interface type including a mobile application, a mobile webpage, and a desktop webpage, identify, based on accessing the data repository, the subset of the group of content elements having at least one of the content attributes that satisfy one or more subset creation criteria, the subset creation criteria indicating a category identifier for a slot in the page template used for generating the page in the online platform for which the request was made, dynamically generate the subset of the group of content elements, where dynamically generating the subset can include: for each content element in the subset, dynamically adjusting presentation of the singular instance of the content element based on presentation requirements of the designated device interface type, the singular instance of the content element being commonly used across all device interface types, and serve the subset of the group of content elements to the client computing device, where the served subset can include the singular instances of the content elements dynamically adjusted for presentation in the designated device interface type. The client computing device can be configured to present the subset of the group of content elements in a graphical user interface (GUI) display and receive user input indicating selection of a content element amongst the subset, the content element being selected for presentation in the slot in the page template used, by the client computing device, for generating the page in the online platform.

In some implementations, the embodiments described herein can optionally include one or more of the following features. For example, receiving a request from a client computing device for a subset of the group of content elements can include receiving user input indicating a selected slot amongst the group of predefined slots in the page template. Identifying the subset of the group of content elements can include identifying each content element having a content attribute that corresponds to at least one attribute of the selected slot. The selected slot can belong to a subset of the group of slots that may be configured to receive and present content elements that correspond to one or more dynamically generated subsets of the content elements.

Sometimes, the server system can also be configured to: automatically generate the page template with the group of predefined slots in predefined positions in the page template, and serve the page template to the client computing device in response to receiving a request, from the client computing device, for the page template to generate the page in the online platform. The request for the page template can be received before the request for the subset of the group of content elements, and the request for the subset of the group of content elements can be received in response to presenting the page template in the GUI display at the client computing device. The page template can include a uniform page structure and a hierarchy of the predefined slots for use across different channels of presentation. A first subset of the group of predefined slots can be configured to receive and present predefined content elements from dynamically-generated subsets of the group of content elements, and a second subset of the group of predefined slots can be configured to receive and present content that is generated based on user input received from the client computing device in response to and at a time that the page template is presented in the GUI display. The first subset of the group of predefined slots can include at least one deals slot, a delivery and pickup slot, a value category slot, and at least one merchant stories slot, and the second subset of the group of predefined slots comprises a category navigation slot, at least one merchant stories slot, a secondary navigation slot, a services slot, and at least one informational slot.

As another example, dynamically generating the subset of the group of content elements can include: adding or modifying one or more parameters for the subset, and adding or removing one or more content elements from the subset based on a determination of whether content attributes of the one or more content elements correspond to the parameters for the subset. The parameters for the subset can include at least one of (i) a duration parameter indicating a length of time that desired content is available for presentation in the slot in the page template, (ii) the category identifier for the slot in the page template, and (iii) a classification type for the one or more content elements. Sometimes, dynamically generating the subset of the group of content elements can include: removing one or more content elements from the subset based on a determination that the one or more content elements has a duration attribute indicating that the one or more content elements is no longer available. The content attributes can include at least one of presentation attributes, image attributes, classification attributes, categorization attributes, facet attributes, text attributes, color attributes, and link attributes. The server system can further be configured to classify each of the group of content elements with metadata including facets to link the content element with at least one of (i) a product available in the online platform and (ii) a page associated with the online platform. The online platform can be an online retail environment.

In some implementations, the server system can further be configured to: receive, from the client computing device, user input to create a content element, transmit, to the client computing device, a graphical user interface (GUI) for presenting selectable options for creating the content element, receive, from the client computing device, user input indicating selection of one or more options presented in the GUI, the user input including one or more user-defined content attributes for the content element, dynamically generate the content element based on the user input, where dynamically generating the content element can include generating a singular instance of the content element that may be dynamically adaptable for presentation in the group of different channels, transmit, in real-time to the client computing device, the dynamically generated content element for presentation in the GUI, and while the dynamically generated content element is presented in the GUI, receive user input from the client computing device indicating one or more modifications to one or more visual content elements or the user-defined content attributes for the content element. The user input may include the one or more user-defined content attributes including at least one of: images for presentation according to one or more image ratios, text for presentation in the content element, and one or more facet values for linking the content element with a product or other page in the online platform. The server system can also, for each content element in the subset, dynamically identify and label the content element based on a respective content intent attribute, the content intent attribute including at least one of delivery content, category value content, delivery and pickup content, and design enriched content, wherein the content intent attribute corresponds to the category identifier for the slot in the page template.

One or more embodiments described herein can include a webserver system for dynamically serving content across a group of device interface types from a common pool of content, the system including: a data repository that can be configured to store a group of content elements, where: each of the group of content elements can be stored in a singular instance and can include one or more visual content elements and one or more content attributes, and the one or more visual content elements can be configured to be visually presented across the group of device interface types based on dynamically adjusting a presentation of the singular instance of the content elements according to presentation requirements of each of the device interface types. The system can also include a server system in data communication with the data repository and a group of client computing devices, the server system being configured to: receive requests for web content from the group of client computing devices, where: the group of client computing devices each correspond to at least one of the group of different interface types, the requested web content can be associated with a web template that identifies a content pool including a subset of the group of content elements, the request designates a content element amongst the subset of the group of content elements of the content pool for presentation, the request designates the device interface type corresponding to each of the requesting client computing devices, the designated device interface type indicates a desired channel for presenting the web content, and the desired channel includes a mobile application, a mobile webpage, and a desktop webpage. The server system can also be configured to: retrieve, based on accessing the data repository, the singular instance of the designated content element from the content pool, dynamically adjust the retrieved content element for presentation in the designated device interface type according to the presentation requirements of the designated device interface type, and serve the dynamically adjusted content element to the requesting client computing devices. The requesting client computing devices can each be configured to present the dynamically adjusted content element in a predefined location in a graphical user interface (GUI) display according to the presentation requirements of the designated device interface type.

The webserver system can optionally include one or more of the abovementioned features. The webserver system can optionally include one or more of the following features. The group of client computing devices can include user devices of customers in an online shopping environment. Retrieving, based on accessing the data repository, the singular instance of the designated content element from the content pool can include dynamically selecting a content element from the content pool that has a duration attribute indicating that the content element is available and has not expired. The requesting client computing devices each may have a different device interface type and corresponding presentation requirements.

The devices, system, and techniques described herein may provide one or more of the following advantages. For example, the disclosed technology can provide for separating content from pages in an online retail environment and/or enterprise platforms so that the content can be readily and dynamically usable and queried across different platforms (e.g., across enterprise platforms, website versions of the online retail environment, mobile versions of the online retail environment, etc.). The content may not need to be re-generated to comply with presentation/formatting standards of the different platforms, which can reduce a quantity of compute resources and processing power that may be used in generating and updating the content as well as generating pages in the online retail environment. Because less compute resources and processing power may be used, the content can be readily, quickly, and efficiently served when requested for presentation in the different platforms. Content creation and/or page development times can also be reduced.

In another example, the disclosed technology can permit for greater efficiency for a content serving system by storing a single instance of each content element instead of multiple distinct instances of each content element adapted for different channels. Such efficiency can use fewer computational resources, including fewer bytes in a content database to store the content elements, and can additionally use fewer computational resources (e.g., processor cycles, memory) for selecting and serving content (e.g., searching across smaller database of content elements for serving).

Moreover, the disclosed technology can provide a development experience and architecture for creating page consistency across different platforms while also enabling a framework for personalized delivery of content to end users interacting with an online retail environment that is developed using the disclosed techniques. Content pool presentations in the online retail environment can represent approximately 20-30% of content refreshes in web and app experiences of the end users. The disclosed technology therefore can provide a consistent page structure and presentation of curated content to drive and improve end user experiences with the online retail environment.

Similarly, the disclosed technology can provide for content classification, categorization, and filtering options to provide various types of relevant content to relevant users of the online retail environment. The classification, categorization, and filtering can drive consistency and relevancy in development of pages for the online retail environment.

The disclosed technology can also improve usability in page and content design for an online retail environment or other online platform. A page template can provide a repeatable framework (e.g., structure) that organizes content types into designated locations on a page, which can drive consistency and predictability across digital shopping experiences in the online retail environment. The same page template can be used for creating any page across an online retail environment. The page template can include predefined slots that may be dynamically changed using the disclosed technology. A relevant user can efficiently plug content elements into any of the predefined slots in the page template across any page so that the page can be readily served across one or more different channels for presentation. This plug-and-play approach can reduce an amount of time needed to design, develop, and create content and pages for the online retail environment while improving a user experience and meeting end consumer expectations in their online shopping experiences.

The disclosed technology can provide consistency of pages across different channels. Images, copy, links, and/or other content can be generated once within a story. Creative consistency can then occur wherever the story is presented, regardless of the page or channel of presentation, thereby providing an intuitive end user experience.

Moreover, the disclosed technology provides efficiency in generating and updated pages to then be presented in different channels. A story can be developed once then efficiently reproduced according to different presentation standards of multiple different channels. If a change is needed or made to the story, the one story can be updated, and the updates can be reflected in real-time or near real-time across presentation of the story in all the different channels. Similarly, the disclosed technology can reduce pre-publish and/or live site issue rates.

As another example, articulating content of a story in its separate parts (e.g., copy, images, etc.) can allow for creation of robust metadata about the story (e.g., classification, categorization). This allows for efficiently rendering content across multiple channels and can also provide consistency in formatting on pages built using this story. Content creators, for example, may not be adding tags or other labels to their content for purposes of identifying it. Rather, the content can be built by the users, then dynamically assessed using the disclosed techniques to generate robust metadata. Consistently generating such metadata about the content can allow for improved site analytics. Specifically, this data can enable analysis about which content is effective and why by assessing commonalities between pieces of content that are over/under performing in different contexts. Consistent metadata for every piece of content can also enable personalization in presenting content that shares common features with content that end users may have interacted with or converted against in the past, and/or content that shares features with items that the end users have interacted with in the past. Similarly, the disclosed techniques allow a unique ability to flexibly reuse the content in different contexts across pages in a site (e.g., cross-channel, cross-placement, and cross-presentation placement in the pages) to achieve a best return on creative investments. The disclosed techniques also may allow a unique ability to flexibly adapt, manipulate, and/or revise the content on the fly, as it is being used in the different contexts across the pages in the site.

The details of one or more implementations are set forth in the accompanying drawings and the description below. Other features and advantages will be apparent from the description and drawings, and from the claims.

BRIEF DESCRIPTION OF THE DRAWINGS

FIGS. 3D, 3E, and 3F illustrate example linking of stories that are edited and/or created using the disclosed techniques.

FIG. 3G illustrates example presentations of a story across different channels.

FIG. 5 is a flowchart of a process for generating stories and mini pools within a content pool.

FIGS. 6A and 6B is a flowchart of a process for generating a page from a page template using predefined stories in one or more mini pools of a content pool.

FIG. 9 illustrates example GUIs for viewing available stories.

Like reference symbols in the various drawings indicate like elements.

DETAILED DESCRIPTION OF ILLUSTRATIVE EMBODIMENTS

This document generally relates to systems, methods, platforms, techniques, and technology to set up, store, and readily serve and query a pool of content across multiple different platforms in an enterprise and multiple different channels (e.g., mobile application, mobile website, desktop website) for use in designing, creating, and/or generating pages of content in an online platform, such as an online retail environment. Content can be separated from specific pages to allow for content pooling and re-usability across the enterprise. In other words, the content can be created once and then dynamically served across any webpage or mobile application, without requiring generation, re-generation, and/or storage of the content for different formats/presentation requirements of the webpage or mobile application.

Relevant users, such as creatives and merchandisers, can search and filter through different content in a content pool, the content being called a story, to determine which story to present in one or more predefined slots in a page template for one or more pages. The stories can be dynamically generated in pages for the online retail environment and dynamically served across different channels having different formatting/ presentation requirements or standards. Story-based taxonomy, classifications, categorizations, links, facets, and other types of attributes can be leveraged for filtering and curating the stories and presenting the stories across different platforms (e.g., enterprise platforms) and channels.

Figure 1:
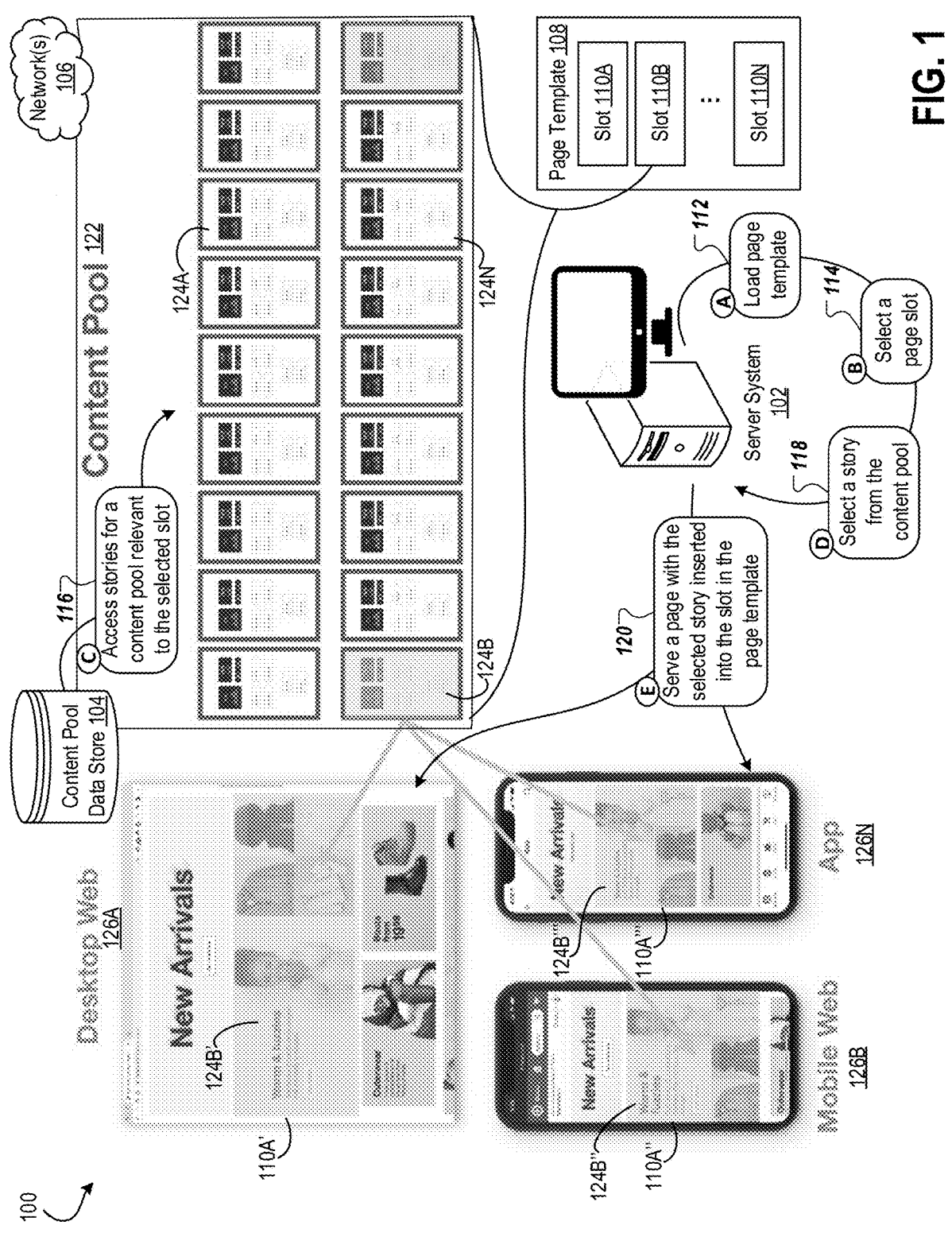
FIG. 1 is a conceptual diagram of a system for generating a page for an online retail environment with stories that correspond to a dynamically generated content pool.

Referring to the figures, FIG. 1 is a conceptual diagram of a system 100 for generating a page for an online retail environment with stories that correspond to a dynamically generated content pool 122. The system 100 can provide a front-end channel for receiving content and dynamically determining how to present the content and what content to present, regardless of a channel of presentation. The system 100 can be similar to a content API. The system 100 can include a server system 102 and a content pool data store 104 that communicate (e.g., wired, wirelessly) via network(s) 106. The server system 102 can be any type of computing system, cloud-based system, user device, computer system, and/or network of computing systems. The data store 104 can be any type of database, data repository, local memory/storage of the server system 102, and/or cloud-based storage system.

The server system 102 can be configured to provide a development environment through which relevant users can create content to be served in pages in the online retail environment in one or more different channels 126A-N. The development environment can be used to generate, update, delete, or otherwise modify stories. The development environment can additionally or alternatively be used to generate, update, delete, or otherwise modify pages that may display one or more of the stories and be served across the channels 126A-N. In some implementations, the server system 102 can automatically and dynamically generate, update, delete, or otherwise modify content pools that are maintained by the content pool data store 104. The server system 102 can generate and update one content pool having stories that are not channel-specific, but rather reusable stories that can be presented in multiple designs across multiple channels. In some implementations, the server system 102 can generate and update more than one content pool. The server system 102 can be configured to serve different information across different platforms, devices, systems, and/or channels. For example, the server system 102 can serve one or more content pools to one or more different computing systems (e.g., devices of relevant users), the server system 102 can serve one or more selected stories to one or more different computing systems (e.g., devices of relevant users), and/or the server system 102 can serve one or more generated pages to one or more different computing systems according to presentation/formatting standards of those computing systems (e.g., devices of end users of the online retail environment).

The content pool data store 104 can be configured to maintain a variety of information, which can be used by the server system 102 in generating content, such as stories and pages in an online retail environment. As described further below, the data store 104 can maintain and dynamically update the stories and content pools of stories so that this information can be readily served across different platforms, both within an enterprise and for end users.

Still referring to FIG. 1, the server system 102 can load a page template 108 in block A (112). The page template 108 can be loaded in response to receiving user input indicating a request to generate, create, edit, and/or build a page for the online retail environment. The page template 108 can include predefined slots 110A-N, which can provide consistency across pages that are generated and served for the online retail environment. Refer to at least FIG. 7A for further discussion. The same page template 108 can be used to generate any pages for the online retail environment. The page template 108 can also be dynamically modified and/or updated over time by the server system 102 to provide continuously improved experiences for end users interacting with the online retail environment.

Figure 4:
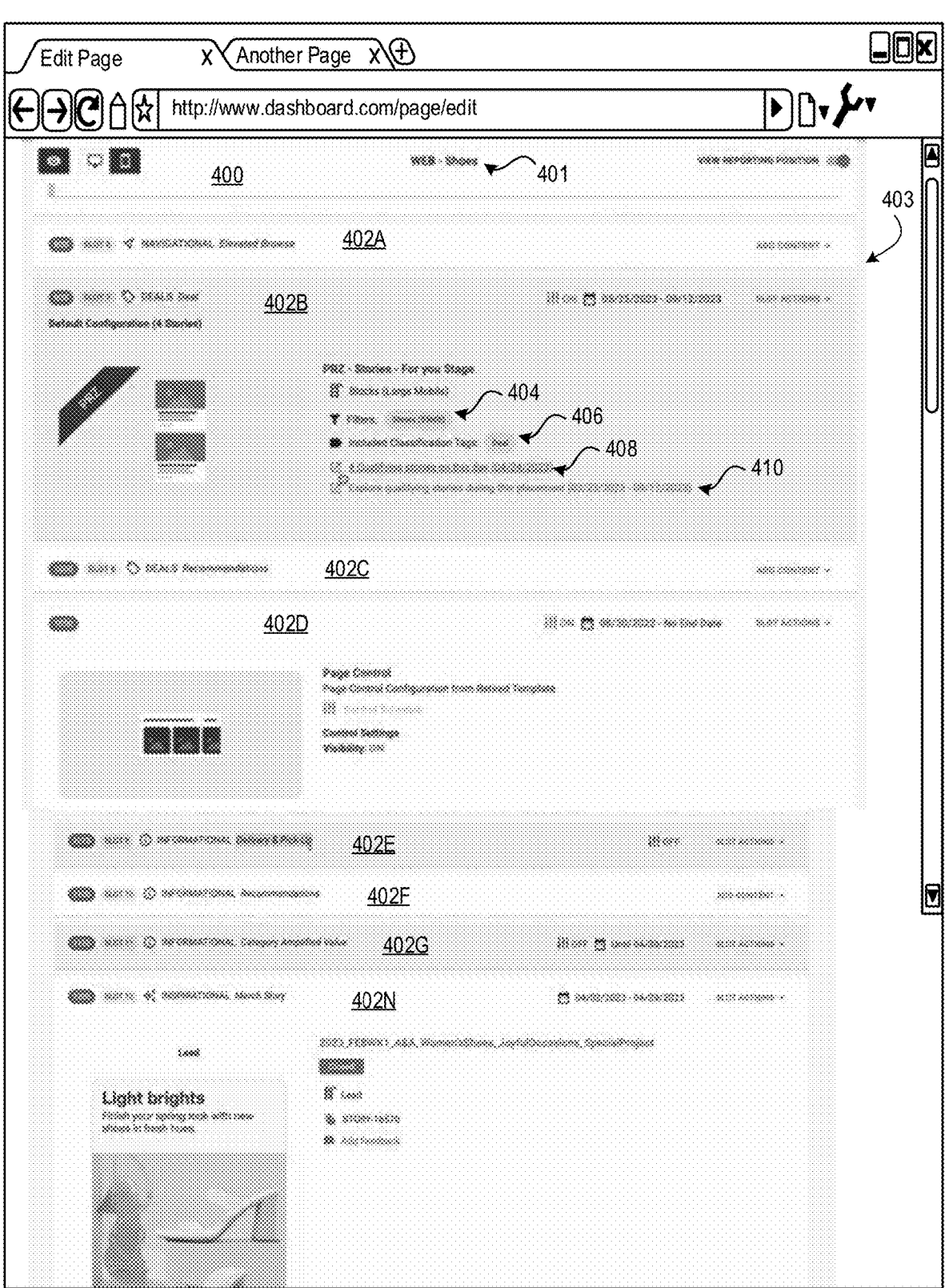
FIG. 4 illustrates an example GUI for editing and/or creating a page from a page template having predefined content slots.

The server system 102 can select one of the slots 110A-N in the page template 108 (block B, 114). The server system 102 can receive user input indicating selection of the slot, such as slot 110A. The selected slot 110A can be one that has one or more content pools associated with it. The server system 102, for example, can determine associations between the slots 110A-N and the content pools maintained in the content pool data store 104. These associations can be based on attributes of stories in the content pools and/or attributes of the slots 110A-N (e.g., links, classification, categorization, etc.), as described further below. Sometimes, one or more of the slots 110A-N may not have associated content pools of stories. Refer to FIG. 4 for further discussion about the slots 110A-N in the page template 108.

In the example of FIG. 1, the selected slot 110A has at least one associated content pool 122. Thus, the server system 102 can access, from the content pool data store 104, stories 124A-N for the content pool 122 that are relevant to the selected slot 110A (block C, 116). The data store 104 can maintain a broader set of stories and/or multiple content pools of stories. The content pool 122 can be a smaller set or a subset of the content pools that are maintained and dynamically updated in the data store 104.

The content pool 122 can contain stories 124A-N that have been previously generated/created. The stories 124A-N can have a same or similar classification type to one another. The stories 124A-N can also have a same or similar classification type to that of the selected slot 110A. Classification type can be a derived attribute about a story based on where the story lands (e.g., what the story links to). If, for example, the slot 110A is designed only for deals, then only the stories 124A-N that are classified as deals may be selected for the slot 110A. Inputs and other attributes associated with each of the stories 124A-N, such as links to other pages, items, or locations in a site, can be assessed by the server system 102 to determine a classification type for the story. The classification type can be determined based on where the story 124A-N links to in the site. As an example, a story can include a link to a deal landing page. Because the story links to the deal landing page, the server system 102 determines that the story should be assigned a classification type of a deal.

Similarly, each of the stories 124A-N can be assigned or otherwise associated with a categorization. The categorization can be determined based on where the stories 124A-N live in the site taxonomy. In other words, the categorization can be a derived attribute based on where the story fits into the site taxonomy from a product hierarchy perspective for that site. For example, the server system 102 can analyze the inputs and other attributes associated with a story to identify items linked in the story and where else those items may connect in the site. The server system 102 can then identify what categories the story is most relevant for. As an illustrative example, if the story includes a new snack product available for purchase on the site and the snack product is linked to a grocery page in the site, then the server system 102 can determine that the story should be categorized as groceries. As another example, if the story includes playing dolls, the server system 102 can determine that the story should be categorized as children→toys→dolls.

In some implementations, the stories 124A-N can be selected for a particular slot in a page template based on those stories 124A-N satisfying one or more filter criteria. The filter criteria can include classification, categorization, and/or a combination thereof. Various other attributes, inputs, and metadata may also be used as the filter criteria. For example, the stories 124A-N can be selected that have a same or similar expiration date. The stories 124A-N can be selected that have same or similar links to particular products, deals, or other pages in the online retail environment. Moreover, the stories 124A-N can have a same or similar link(s) to that of the selected slot 110A. As described herein, the server system 102 can generate metadata about the stories 124A-N based on their inputs, content, and other attributes. This metadata can be used to group stories or otherwise add stories to the content pool 122. Moreover, association of one story with a particular link, attribute, classification, categorization, etc., can be used to glean insight about associations of other stories with the content pool 122. For example, it can be desired to have a sale on dresses in an online retail environment for a particular period of time (e.g., an upcoming month). The server system 102 can identify which of the stories 124A-N can be added to the content pool 122 that have attributes associated with dresses. One story, for example, can have a link to a page having dresses for 20% off. The server system 102 can trace the link to the page to see what types of items are available in the linked page (e.g., destination) and therefore determine how to classify, categorize, and/or associate the story. Since a majority of the items in the linked page may be dresses, the server system 102 can classify the story as a deal and categorize the story as apparel→dresses. These attributes (e.g., classification, categorization) can be part of the story's metadata and therefore used by the server system 102 to decide whether to add the story to the content pool 122 for the dresses sale.

Figure 3A:
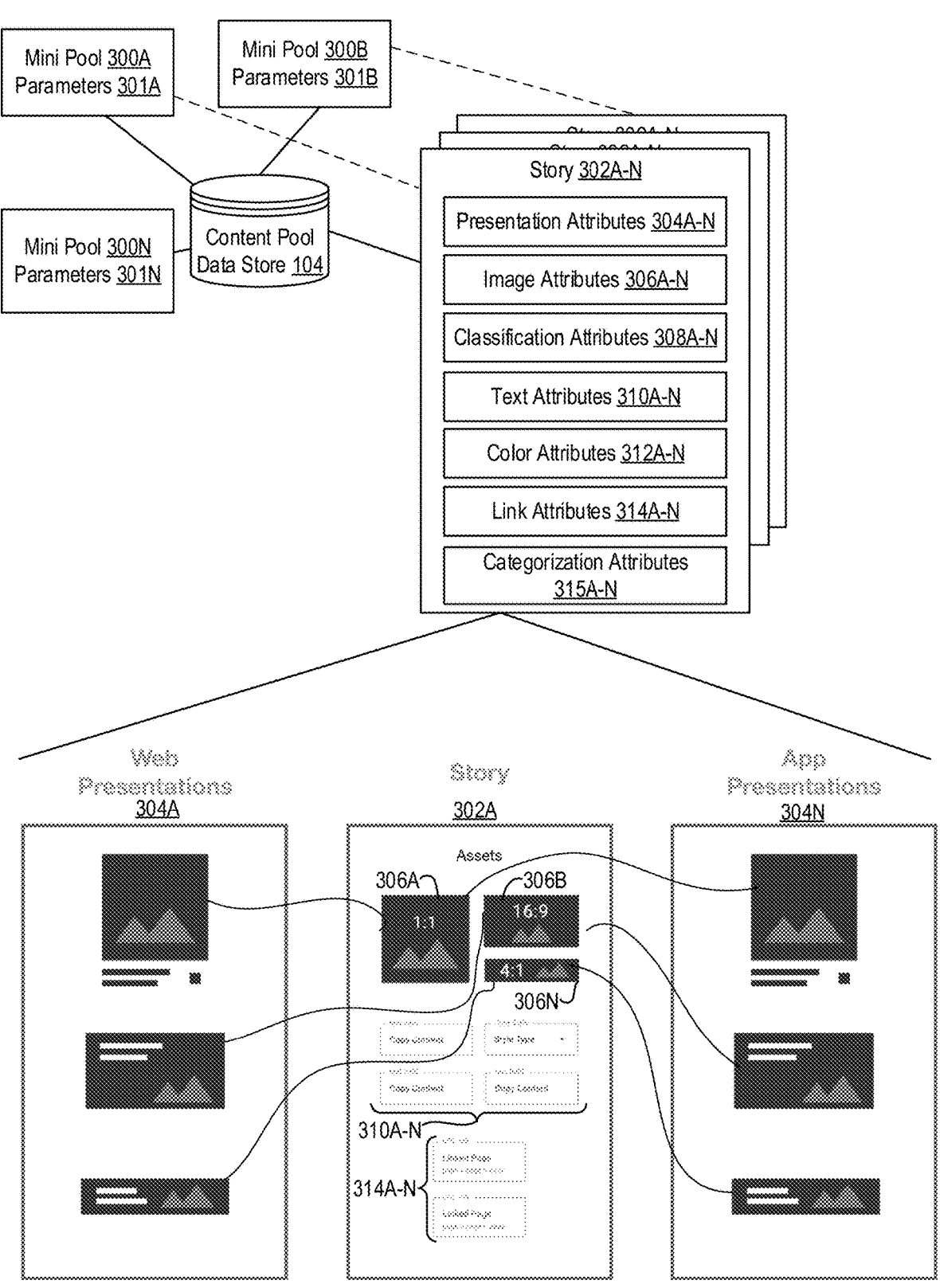
FIG. 3A is a conceptual diagram of data elements for an example story that can be generated, maintained, and served for page generation in an online retail environment.
Figure 3B:
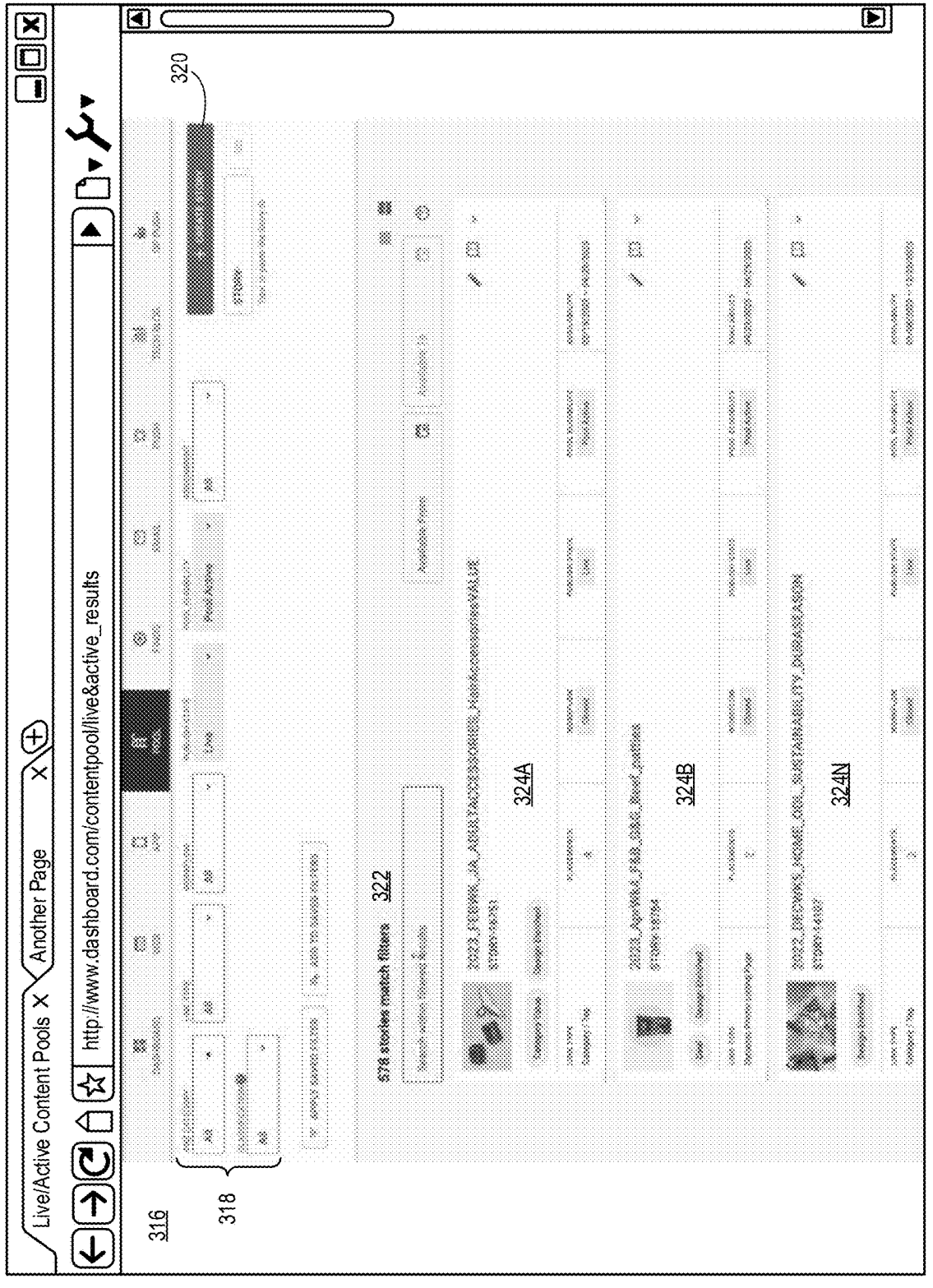
FIG. 3B illustrates an example graphical user interface (GUI) for viewing and filtering predefined stories in a content pool.

The server system 102 can select one of the stories 124A-N from the content pool 122 in block D (118). The server system 102 can receive user input indicating selection of the story 124B, for example. Thus, the relevant user can select the story 124B to be presented in the slot 110A for the page when the page is served in one or more of the channels 126A-N. Therefore, whatever story is selected can then be replicated or otherwise applied in a same or similar slot for the page when the page is served across any of the different channels 126A-N. Refer to FIG. 3B for further discussion about selecting from amongst the stories 124A-N in the content pool 122.

In block E (120), the server system 102 can serve the page with the selected story 126B inserted into the selected slot 110A in the page template 180. The server system 102 can serve the page to one or more of the channels 126A-N. The channels 126A-N can include, for example, a desktop web channel 126A, a mobile web channel 126B, and/or a mobile application channel 126N. One or more other channels can also be designated and used for presenting the page(s) for the online retail environment. Refer to FIG. 3A for further discussion about serving the same page content across multiple different channels.

As shown in FIG. 1, the same story 124B can be served and automatically presented differently in each of the channels 126A-N based on presentation/formatting standards of those channels. For example, in the desktop web channel 126A, the story 124B can be presented as story 124B' in selected slot 110A', in which the selected slot 110A' is automatically presented in a wide, landscape ratio/arrangement relative to other components in the page. In the mobile web channel 126B, the story 124B can be presented as story 124B" in selected slot 110A", in which the selected slot 110A' is automatically presented in a narrow, portrait landscape ratio/arrangement relative to other components in the page and in comparison to the selected slot 110A' in the desktop web channel 126A. The story 124B" is similarly automatically adapted to fit the selected slot 110A" in the mobile web channel 126B. In the mobile app channel 126N, the story 124B can be presented as story 124B''' in selected slot 110A''', in which the selected slot 110A' is automatically presented in a narrower, portrait landscape ratio/arrangement relative to other components in the page and in comparison to the selected slot 110A' in the desktop web channel 126A and the selected slot 110A" in the mobile web channel 126B. The story 124B''' is similarly automatically adapted to fit the selected slot 110A''' in the mobile app channel 126N.

In some implementations, blocks A-E (112-120) can be performed as querying operations by the server system 102. Information from performing each block can then be provided to another computing system, such as a computing device of a user. For example, the user can provide input at their device requesting the page template 108. The server system 102 can receive the input from the device and serve the page template 108 to the device. The server system 102 can similar receive requests for and serve the selected page slot, the relevant content pool, and/or the selected story to the device.

Figure 2A:
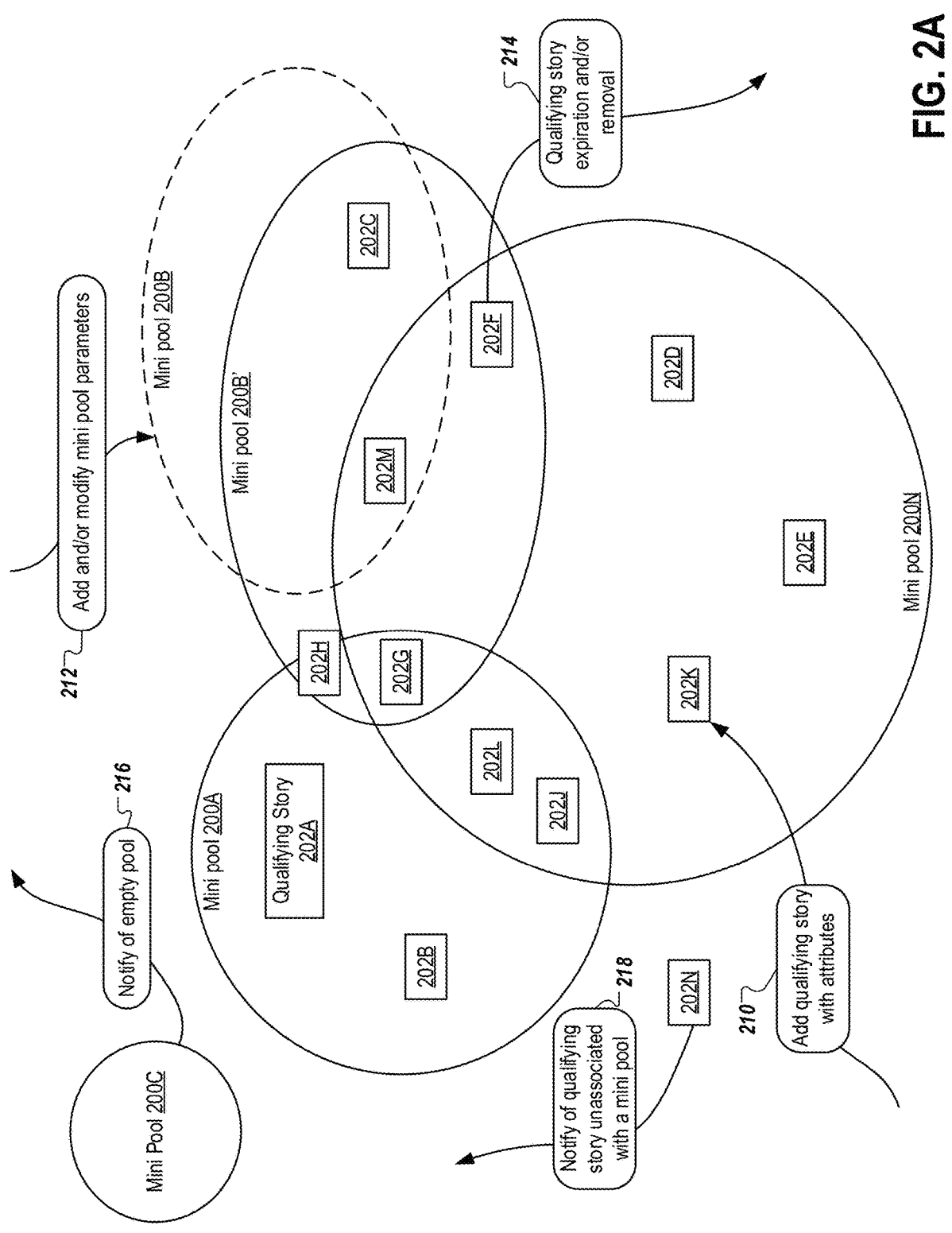
FIG. 2A is a conceptual diagram of mini pools that are dynamically generated and modified with qualifying stories.

FIG. 2A is a conceptual diagram of mini pools 200A-N that are dynamically generated and modified with qualifying stories 202A-N. A singular content pool can be maintained with the mini pools 200A-N to which the qualifying stories 202A-N can be added and/or removed. The mini pools 200A-N can be sub-groups or selected groups of stories that qualify based on satisfying one or more filter criteria for selection in one or more particular slots in a page template. The filter criteria, as described above, can include but is not limited to classifications and categorizations. Accordingly, the mini pools 200A-N can include classifications (e.g., where/to what a story links) and categorizations (e.g., site taxonomy), which may fall hierarchically under/within the singular content pool. Some of the mini pools 200A-N may overlap, which means sometimes one or more different classifications and categorizations may overlap with each other (e.g., a story having a shirt on sale may be categorized as apparel and also classified as a deal, so the shirt story can be added to an apparel categorization mini pool and a deals classification mini pool). As described herein, classification and/or categorization attributes of the stories 202A-N may also be used to determine which of the stories to add to which of the mini pools 200A-N for particular slots in a page template. One or more other dynamic filtering criteria may also be used to select stories for particular mini pools and/or selection for one or more particular slots in the page template.

The singular content pool can be used to maintain all content and make that content available and compatible across all platforms and channels. Because of the singular content pool, a story or other content may not be disqualified from inclusion for a particular page simply because the story does not have certain attributes to be presented in that particular page. In some implementations, multiple content pools can be generated and maintained.

Unlike standard webpage generation that can run search queries, access content, and produce the content for a particular channel, the disclosed technology provides for amorphous and dynamically changing qualifying stories 202A-N and mini pools 200A-N, which can then be used in creating pages for an online platform, such as an online retail environment, where those pages have content (e.g., the qualifying stories 202A-N) that was previously generated, decoupled from any particular page, and automatically adaptable for presentation in any channel (e.g., mobile application, mobile website, desktop web). The qualifying stories 202A-N can be added to the mini pools 200A-N, each of which may have different attributes and/or one or more qualifying criteria, then selected and served, as described at least in reference to FIG. 1, using user-friendly, easily-digestible GUIs. Refer to at least FIG. 3C for further discussion about using attributes and metadata associated with the stories 202A-N for selecting and presenting the stories 202A-N in pages of the online retail environment.

Furthermore, any of the qualifying stories 202A-N can be dynamically generated and available for qualified periods of time. For example, when a user decides to add a story under a DEALS slot in a page, a first set of the stories 202A-N within at least one of the mini pools 200A-N may qualify and be available to be placed in the DEALS slot during a particular period of time. However, during a next period of time, the first set of the stories 202A-N may no longer be available for selection and placement in the DEALS slot. Whether the first set of the stories 202A-N is available can be automatically determined by the computing systems described herein, without human intervention, and may sometimes depend on whether any products are in a pool of products associated with the first set of stories 202A-N to share (and those products are currently on sale or having some other type of promotion, such as all dresses being on sale for an upcoming month). The computing systems may expire and/or remove one or more of the qualifying stories 202A-N from one or more of the mini pools 200A-N, such as the story 202F in both mini pool 200B' and the mini pool 200N (214).

When stories are generated by relevant users, they can be automatically added to one or more of the mini pools 200A-N, based on assessment of their respective attributes, metadata, and/or links. As an illustrative example, the story 202K was generated by a user and added automatically to the mini pool 200N because the story 202K links to soda items on sale and the mini pool 200N corresponds to a deals page in a grocery page for the online retail environment (210). This link classifies the story 202K as a deal. The mini pool 200N includes attributes for grocery items and, more particularly, grocery items on sale. Therefore, the computing systems described herein can automatically add the story 202K to the mini pool 200N. When another user generates a grocery page for the online retail environment, stories in the mini pool 200N, such as the story 202K, can be retrieved and served to the user to choose from. Sometimes, the user may generate a story, such as the story 202N, which may not have attributes or links that are associated with any of the mini pools 200A-N. As a result, the user can be notified that the story 202N is unassociated with the mini pools 200A-N, which may cause the user to modify one or more attributes associated with the story (218).

As shown in FIG. 2A, sometimes one or more of the stories 202A-N may have attributes that cause the stories 202A-N to be part of multiple mini pools 200A-N (e.g, story 202G being part of the mini pools 200A, 200B, and 200N). The mini pools 200A-N can also be ever-changing and amorphous. For example, the mini pool 200B expands to mini pool 200B' to encompass more stories as a result of computing systems described herein adding and/or modifying parameters associated with the mini pool 200B (e.g., the mini pool 200B included attributes indicating sale on grocery items for a short period of time and now the mini pool 200B' attributes indicate sale on grocery items for a longer period of time) (212).

Sometimes one or more of the mini pools 200A-N may contain no stories, and thus one or more relevant users can be notified (216). As a result, the notified users can generate stories that may be associated with the empty mini pools (e.g., mini pool 200C). As an illustrative example, a merchandising team of the online retail environment can indicate that they would like to promote sales on back-to-school gear. The computing systems described herein can automatically generate a mini pool with attributes associate with sales, deals, and back-to-school gear. Other users can be notified of the promotion. Accordingly, the users can generate stories that support the promotion. The computing systems can automatically analyze the attributes, links, and other inputs for the generated stories to classify and categorize such stories and add them to the mini pool for back-to-school gear sales.

Figure 2B:
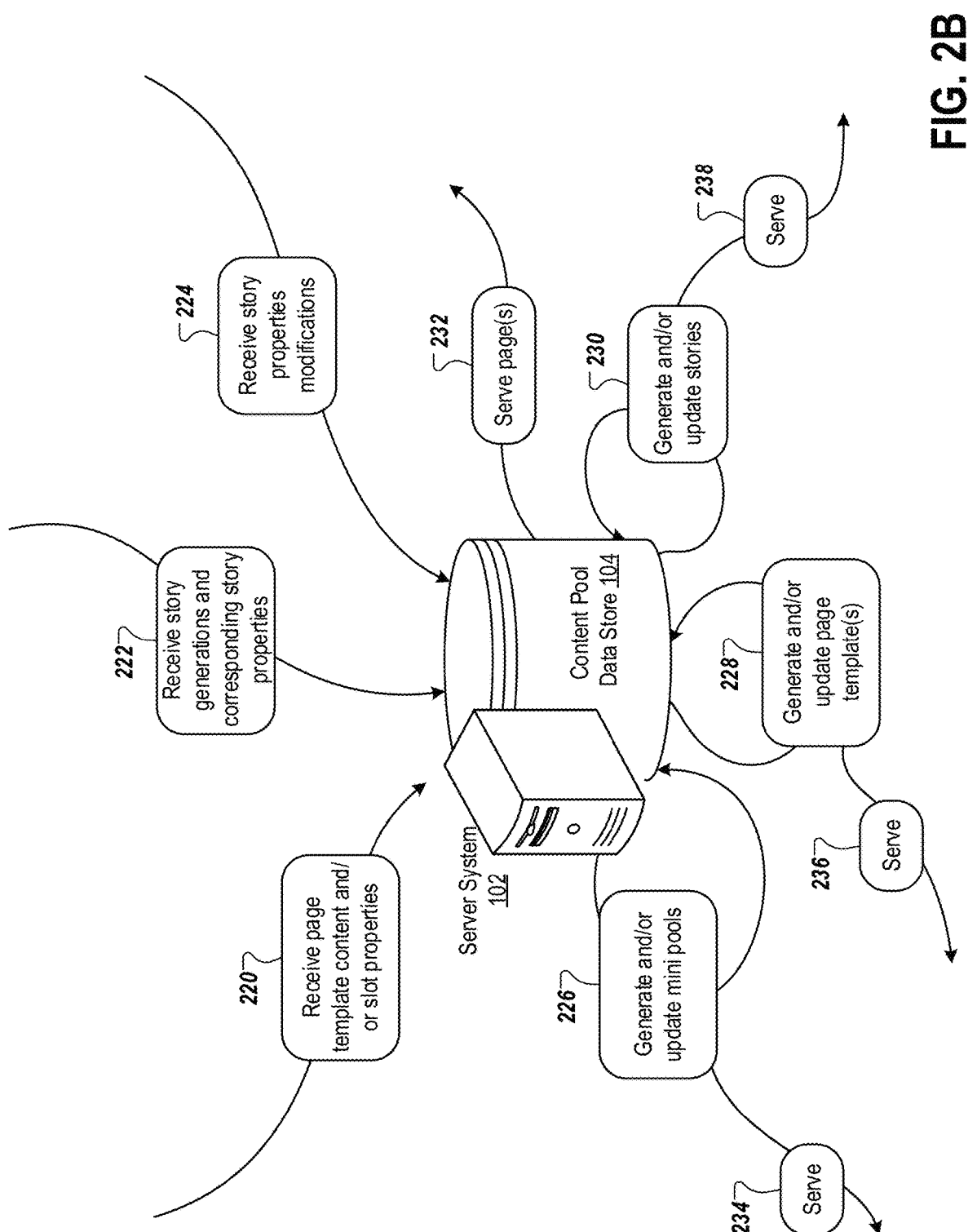
FIG. 2B is a conceptual diagram of a content pool data store that can dynamically generate, modify, maintain, and/or serve stories, content pools, page templates, and/or pages for different platforms.

FIG. 2B is a conceptual diagram of the server system 102 and content pool data store 104 that can dynamically generate, modify, maintain, and/or serve stories, mini pools, page templates, and/or pages for different platforms. As described herein, one or more users of an online retail environment can generate content for page templates and/or properties or other data for slots presented in the page templates (block 220). Page templates that are maintained in the data store 104 can then be updated or otherwise generated using the content and/or slot properties (block 228), then served to one or more users in an enterprise. The page templates can be served to computing devices of the users that generated the content and/or slot properties. The page templates can also be served to computing devices of other users who use the page templates to generate pages for the online retail environment.

One or more of the users can generate stories and properties (e.g., attributes, inputs, links) for the stories, which can be received and stored in the data store 104 (block 222). The stories can accordingly be generated and/or updates (block 230), then served to one or more computing devices (block 238), as described above. Refer to at least FIG. 3C for further discussion about generating the stories.

Figure 3C:
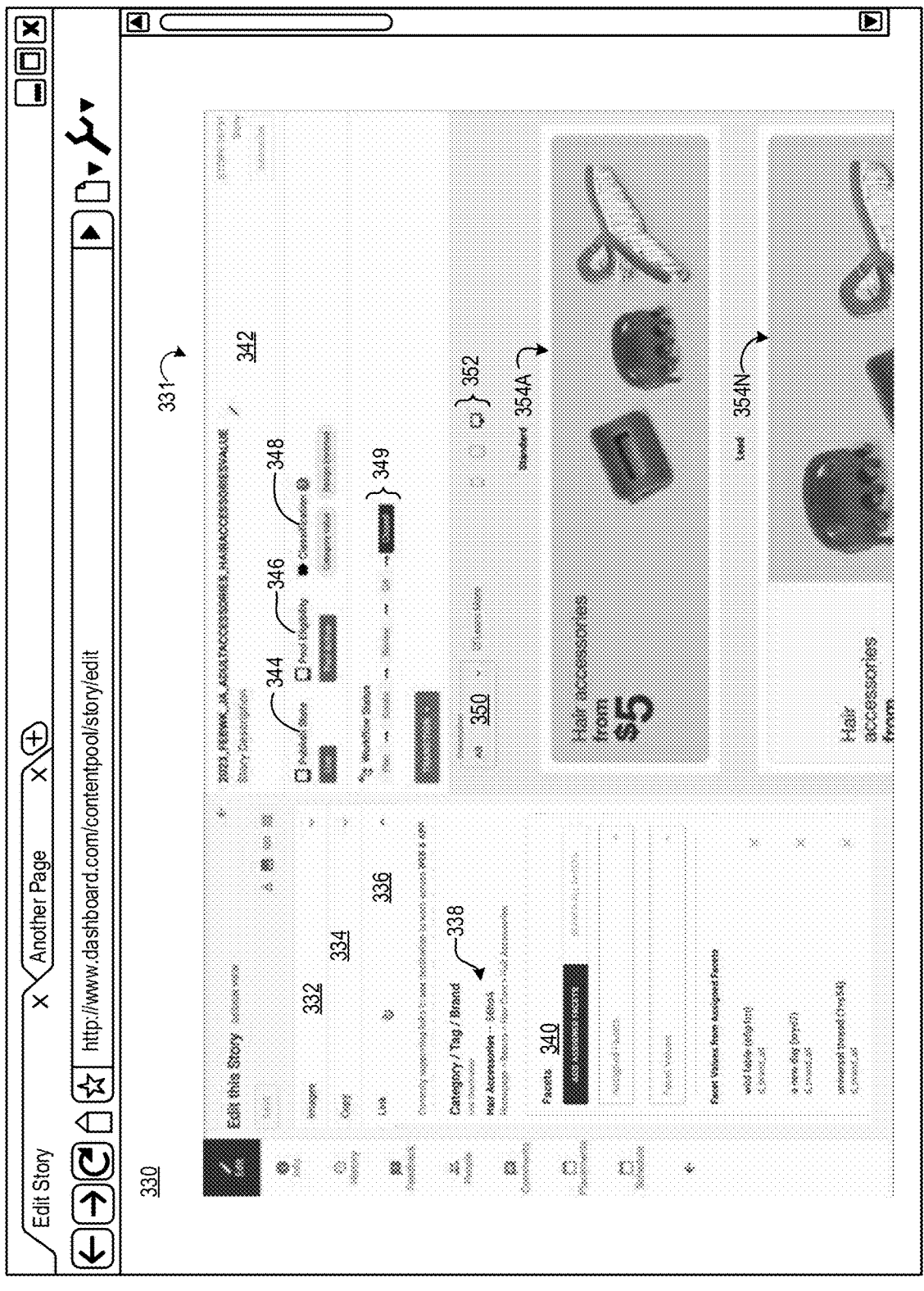
FIG. 3C illustrates an example GUI for editing and/or creating a story.

One or more of the users can update story properties, which can be received by the data store 104 (block 224). The stories can accordingly be updated (block 230), and then served (block 238). Refer to FIG. 3C for further discussion.

One or more mini pools can be generated and/or updated (block 226), as described in reference to at least FIG. 2A. The mini pools can be served to the one or more computing devices (block 234), for example, in response to receiving a request from a computing device of a user to add a story to a DEALS slot in the page template for a page that is being developed. One or more of the developed pages can also be served (block 232) to computing devices of the relevant users and/or computing devices of end users, such as consumers interacting with the online retail environment.

Sometimes, as described herein, a search query can be provided by a user for a DEALS slot in a particular page. The server system 102 can run the search query on the content pool data store 104 to identify relevant stories and dynamically generate and serve a mini pool of the relevant stories (blocks 226 and 234). Because the dynamic nature of the disclosed techniques, relevant content can be quickly identified and readily provided to the user to generate relevant pages for an online retail environment or other online platform.

Over time, any of the page templates, slot properties, stories, story properties, and/or mini pool parameters can be modified or adjusted over time by any relevant users to an enterprise. Modifications made by any of the users can be reflected across all queried instances so that all the users can dynamically receive relevant, updated, and uniform content. Feedback from one or more users may also be received and utilized by the server system 102 to tweak parameters of the page templates, slots, stories, and/or mini pools, which further lends to the dynamic nature of the disclosed techniques.

FIG. 3A is a conceptual diagram of data elements for an example story 302 that can be generated, maintained, and served for page generation in an online retail environment. Although the story 302 is described in reference to an online retail environment, one or more stories 302A-N can be generated for other types of online platforms, including but not limited to social media platforms, blogs, websites, etc.

The content pool data store 104 can maintain a plurality of dynamically generated and served mini pools 300A-N, each having respective parameters 301A-N. The parameters 301A-N can be dynamically modified, by a computing system described herein and/or by user input provided by one or more relevant users to an enterprise. In some implementations, the mini pools 300A-N may not be stored by the data store 104, but rather their respective parameters 301A-N can be stored. When a request or search query is made for relevant stories 302A-N for developing a particular page in the online retail environment, one or more of the mini pools 300A-N can be dynamically generated and served based on matching or identifying correlations/associations between the respective parameters 301A-N and one or more attributes in the search query/request and/or the stories 302A-N. As shown in FIG. 3A, one or more of the stories 302A-N can be associated with one or more of the mini pools 300A-N. Refer to FIG. 2A for further discussion about generating and/or modifying the mini pools 300A-N.

Each of the stories 302A-N can include one or more attributes (e.g., data elements) that can be structured uniquely for the story so that the story can be dynamically selected and then served on different platforms of the enterprise and/or channels. For example, each of the stories 302A-N can include presentation attributes 304A-N, image attributes 306A-N, classification attributes 308A-N, text attributes 310A-N, color attributes 312A-N, link attributes 314A-N, and/or categorization attributes 315A-N. Any of these attributes can be identified as metadata associated with the story and used by the server system 102 described herein to determine how to format and uniformly place information in the particular story, regardless of a channel in which the story will be presented, and whether and when to add the story to the content pool 300. These attributes allow the respective story to be readily producible across the different platforms of the enterprise and/or channels, thereby improving user experience and visual appearance of such content across the online retail environment. Refer to FIGS. 3C-H for further discussion about each of these attributes.

The story 302A can include the images 306A-N. Each of the images 306A-N can have a different ratio for presentation. When the images 306A-N are produced in different channels, such as the web presentation 304A and/or the application presentation 304N, the images 306A-N can each be automatically adapted for presentation in such channels based on these channels' respective presentation parameters and the images' ratios. Similarly, the story 302A's text attributes 310A-N and the link attributes 314A-N can be presented in each of the presentation channels 304A-N when served according to these channels' presentation attributes.

FIG. 3B illustrates an example graphical user interface (GUI) 316 for viewing and filtering predefined stories 324A-N in a content pool 322. The GUI can present filtering criteria 318 (e.g., classification, categorization). A relevant user can provide input indicating parameters for filtering stories that may be presented in a content pool, such as the content pool 322. The server system 102 described herein can receive the user input for the filtering criteria 318 and use the input to dynamically curate the content pool 322 with the stories 324A-N and present the content pool 322 in the GUI 316. The user can then select any of the stories 324A-N to edit, modify, and/or use the selected story in content and/or page creation. The user can use the filtering criteria 318 to identify stories that have been generated for the category A products. The user can then select one or more of the resulting stories and customize them for presentation on the one or more pages that the user is developing for the category A products.

The GUI 316 can also present a selectable option (e.g., button) 320, which allows the user to create a new story. The new story can be created for the particular content pool 322. The new story can also be created and stored, then dynamically added to one or more content pools by the server system 102 and in response to user input indicating one or more search queries and/or filtering criteria 318. Selecting the option 320 can allow the user to create a new story from scratch, by filing out one or more input fields presented in another GUI (e.g., refer to FIG. 3C). Selecting the option 320 can allow the user to clone an existing story. All information from the previously-generated story can be added to a new story if the user enters a unique identifier associated with the previously-generated story. The user can then adjust any of the information or provide new information in the input fields for the new story.

The filtering criteria 318 can include but are not limited to personalization category, link type, workflow, publish state, pool eligibility, assignment, and/or classification.

Personalization category indicates personalization information that may be used to associate stories with particular slots, pages, etc. Classification can indicate different types of classifications for the story, as described in reference to FIG. 1, which can be derived from metadata for the story. Similarly, categorization can indicate different categorizations for the stories, as described in FIG. 1. The link type can be used to infer classification, and can be used to filter resulting stories based on whether the link type is for group offers, dynamic listing pages, etc. Workflow can be used to filter the stories based on status of processing/completion of story generation. Publish state can be used to filter the stories based on whether they are pending publication, live, etc. Eligibility similarly can be used to filter the stories based on whether the stories are active (e.g., in a pool, not assigned to a pool). Assignment can be used to filter the stories based on what users the stories are assigned to/associated with. Although some filtering criteria is described here, any other filtering that may be applied to particular slots in a page template can also be used in the GUI 316 for top-down filtering of stories in the content pool.

The classification filtering criteria can allow the user to select whether to include one or more predefined classifications or exclude one or more predefined classifications. For example, the user can select to include one or more of the following: deals, design enriched, category value, pickup and delivery, finds, brand, and/or unclassified. The user can select to exclude one or more of the abovementioned pre-defined classifications. The classifications can map to different parts, areas, and/or slots of a page. For example, the design enriched classification content can map to information being presented at a top of a page while the deals classification content can map to information being presented at a bottom portion of the page. Using the classification filtering criteria, the user can identify a type of content that they would want to show on the page(s) that they are developing, editing, and/or modifying.

FIG. 3C illustrates an example GUI 330 for editing and/or creating a story 331. The story 331 can be the example story 324A presented in the GUI 316 of FIG. 3B. The GUI 330 can present one or more selectable features (e.g., tabs, buttons, text fields, radio buttons, selectable options, etc.) for editing and/or creating the story 331.

The GUI 330 can include a selectable presentation option 350, in which the user can select which type of presentation they would like to see, edit, and/or create for the particular story 331. The GUI 330 can also include a selectable graphical depiction 352 of different channels for which to present the particular story 331 (e.g., mobile, tablet, desktop computer). In the example of FIG. 3C, the user has selected all presentations from the option 350 and a desktop channel from the graphical depiction 352. As a result, the particular story 331 is presented in all presentations 354A-N for desktop computers. The user can then interact with the GUI 330 to modify any of the presentations 354A-N individually or all together, in the aggregate.

The GUI 330 includes selectable tabs for images 332, copy 334, and link 336. The user can provide inputs in any of these tabs to create and/or modify the particular story 331. The images 332 can include any one or more images that may be presented in the story 331 in the various presentations 354A-N. The copy 334 can include any text to be presented in the story 331 in the presentations 354A-N.

The link 336 can include any association(s) to products that are available (e.g., for purchase) in the online retail environment. The link 336 can further include one or more category classifications 338, which can correspond to a link destination. The classifications 338 can be content identifiers that enable dynamic, personalized delivery of content associated with the story 331. The link 336 can also include one or more facets 340, which can correspond to taxonomy for further categorizing the story 331 and associating the story 331 with different content, categories, tags, and/or brands in the online retail environment. The facets 340 can be used to drive and control what page or pages the story 331 may link to, and more specifically, what specific products to send an end user to if the user clicks on the story 331 (e.g., a facet can link the story to a particular item on a particular page in the site taxonomy). Assigned facets can include facets that are automatically recommended to the user for the particular story 331. The assigned facets can be determined automatically by assessment (e.g., by the server system 102) of various inputs and/or other attributes that the user has added to the story 331. The user may also select and/or add other facets, such as global facets, to the story 331, which may or may not include the assigned facets. Sometimes, the facets can be visible to end users of the online retail environment (e.g., when the user goes to a particular page, they can filter items in the page by 'red shoes,' which can be a facet). Sometimes, one or more of the facets can be global and/or more generic facets that may apply to multiple pages and/or the site as a whole.

The link 336 tab can provide, from a metadata perspective, more granular information about the specific content/products being presented in the story 331, which may also be used as an input in determining (e.g., by the server system 102) best content to present to a particular guest/end consumer/user to ensure they receive and see the most relevant content relative to their search history and interactions with the online retail environment. Such granular information can include links to items, pages, facets, and/or other information associated with a site taxonomy. These links can be used by the computing system described herein to automatically classify and/or categorize the story 331, such as associating the story 331 with one or more mini pools and serving the story 331 to user devices requesting stories for selection and presentation in particular slots in particular page templates.

The GUI 330 can further present information such as a publish state 344, a pool eligibility 346, and/or a classification 348. Any one or more of the information 344, 346, and 348 can be determined automatically by the server system 102 based on assessment of the information, attributes, and/or metadata associated with the story 331. The GUI 330 can present a workflow status 349, which can be automatically updated (e.g., by the server system 102) based on inputs provided by the user in editing and/or creating the story 331 in the GUI 330. The workflow status 349 can indicate how much progress has been made on editing and/or creating the story 331. For example the workflow status 349 indicates that the particular story 331 is closed. A story can be closed when all required input fields are completed. For example, the story 331 can be identified as closed if all the images 332 are provided in different required sizes and/or ratios for each of the presentations 354A-N (e.g., 1:1, 16:9, and/or 4:1). One or more other image assets may be required before the story 331 can be automatically identified as closed by the server system 102. The publish state 344 and the pool eligibility 346 can also be dynamically driven.

As an author of the story 331, the user can adjust and/or provide any of these inputs. The user can provide information such as a story title, which can be a required input for the workflow status 349 of the story. Sometimes, the user can provide information such as a story description and/or a strategy direction for the story. The strategy direction can include a copy direction, a design direction, and/or a sales event alignment, if applicable. Sometimes, the user can provide information such as a team of users and/or one or more users in an enterprise that are associated with the story (e.g., users or teams executing the story, such as producers, planners, designers, writers, and/or quality assurance users). The user can also provide information such as dates that the particular story would be value for on any page of an application or website channel. The dates can include a start date and/or an end date. The start and end dates can be used by the server system 102 described herein to determine when the particular story can be used in personalization efforts and served to end consumers.

As described herein, using the GUI 330, the user can statically curate and dynamically choose content for presentation in different enterprise platforms without having to re-generate the content to comply with standards of such platforms. Data elements to be presented in the content, such as the images 332, can be cached such that a front end server (e.g., the server system 102) may simply respond to a user action to use that content by retrieving the cached data elements and automatically determining placement of the retrieved data elements in the enterprise platform(s).

The GUI 330 can allow the user to do live typing/ modifications to the presentations 354A-N of the story 331 to benefit accessibility, dark mode, accuracy, and/or immeimage are separated (e.g., not in a unified space). Below is an example table of some illustrative options for type styling within stylized and channel default types.

TABLE 1 illustrative options for type styling within styled and channel default types

| Type Styling | Stylized Type | Channel Default |
|---|---|---|
| Headline | Type stack size; special characters can be altered (e.g., price, cents, alt) | Size is not editable; special characters can be added but not stylized |
| Subhead | Type stack size; special characters can be altered | Size is not editable; special characters can be added but not stylized |
| Fine Print | Size is not editable; special characters can be altered | Size is not editable; special characters ca be added but not stylized |
| Type Stack | Possible options: XLarge, Large (default), Medium, Small | Size is not editable |
| Text Position | Possible options: top left, top center, top right, middle left, middle center, middle right, bottom left, bottom center, bottom right | Static; left aligned placement |
| Text Area Width | Can adjust width by percentage | Full width of the presentation | diacy of updates. Desktop and tablet presentations can scale uniformly, such as at 1:1 with the same images, breakpoints, and formatting. Applications and mobile web presentations can share the same images, breakpoints, and formatting with a true parity. Designed with multiple channels in mind, the disclosed technology provides for story presentations that have global UI differences from traditional components used in designing pages. As a result, the disclosed technology can provide for closer parity between mobile, web, and application UIs.

As shown in the presentations 354A-N of the story 331, rounded corners and/or stroke borders can allow the story 331 to look actionable, similar to traditional application components. No full bleed and/or unlinked content can be available for the presentations 354A-N. Moreover, one or more of the presentations 354A-N can include an optional, additional fine print copy/text field, where additional information can be provided/presented (e.g., legal standards or descriptions, offer limitation details). This optional copy/text field may not be affected by type position changes to the presentations 354A-N.

Figure 3D:
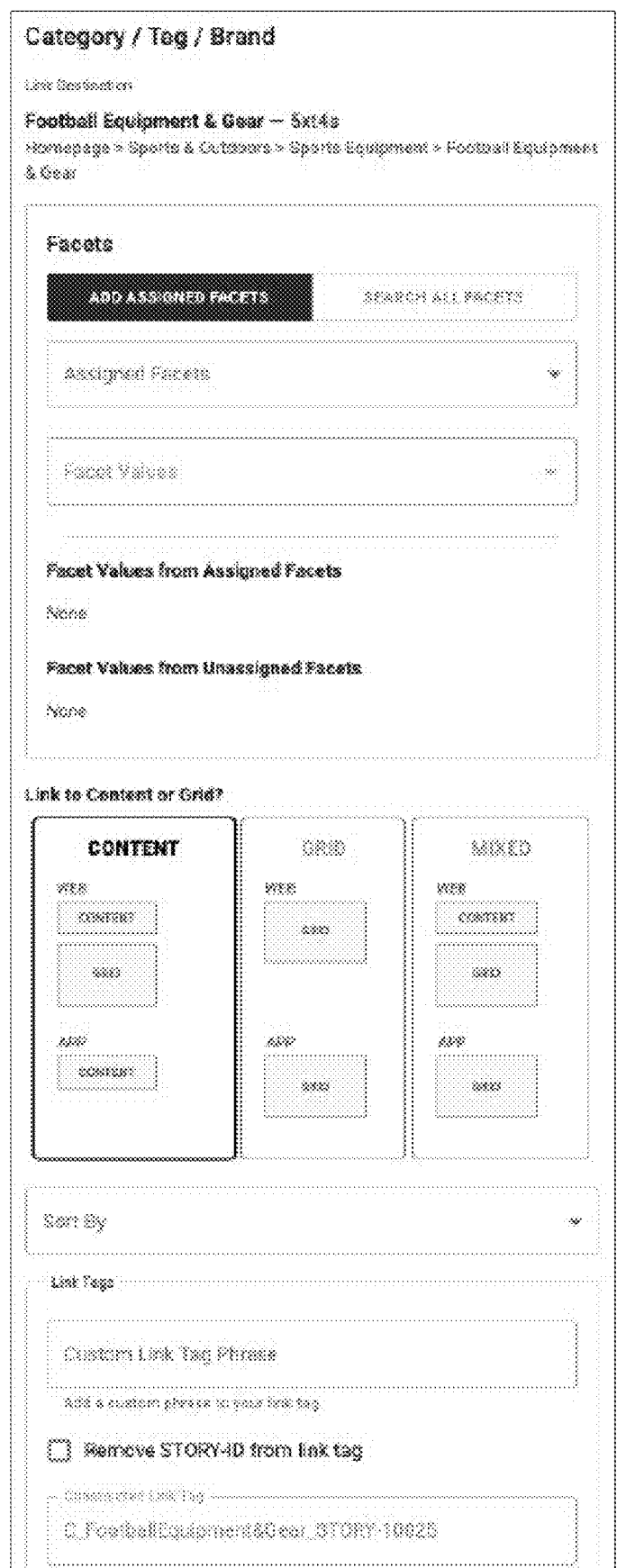
Figure 3E:
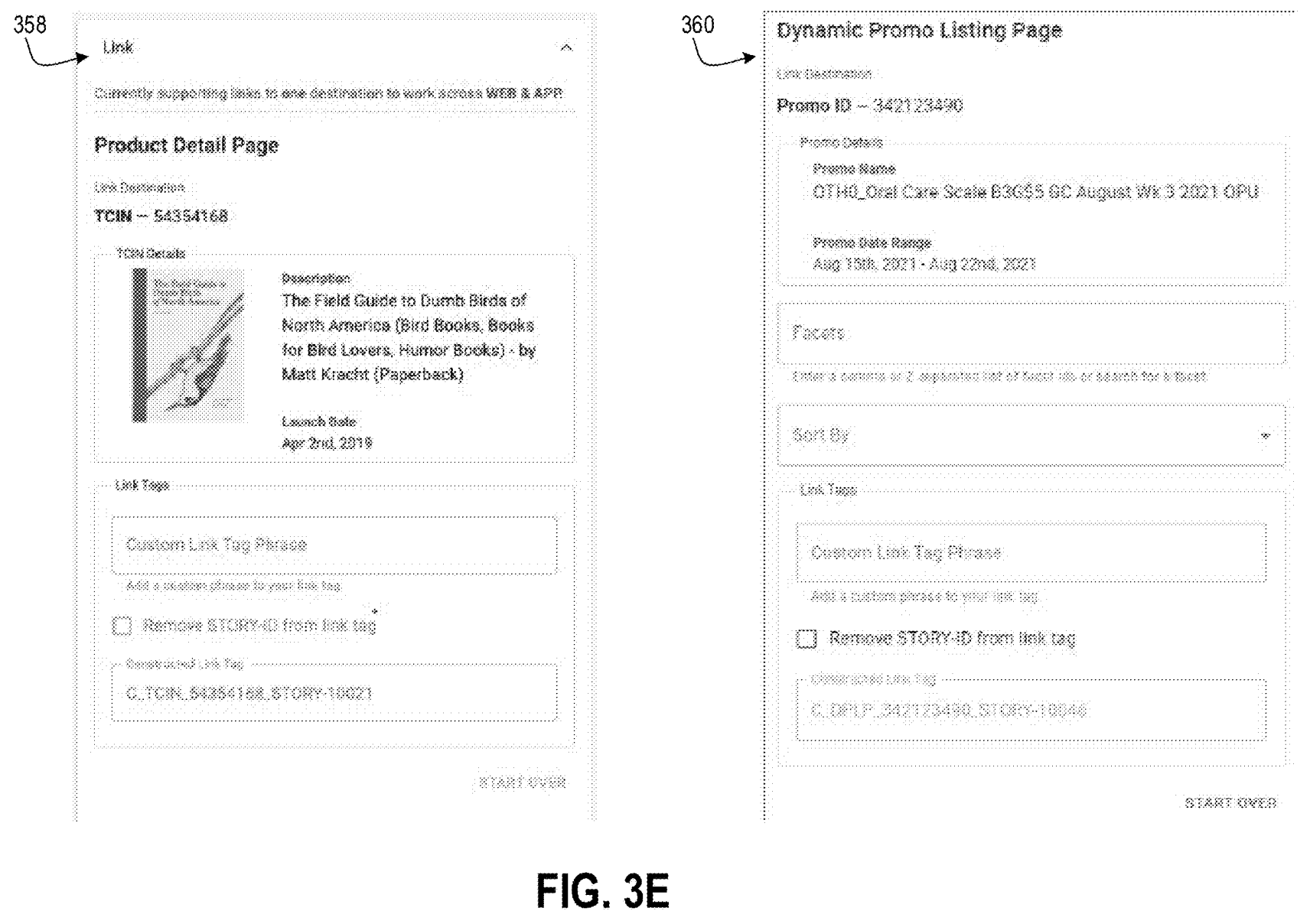
Figure 3F:
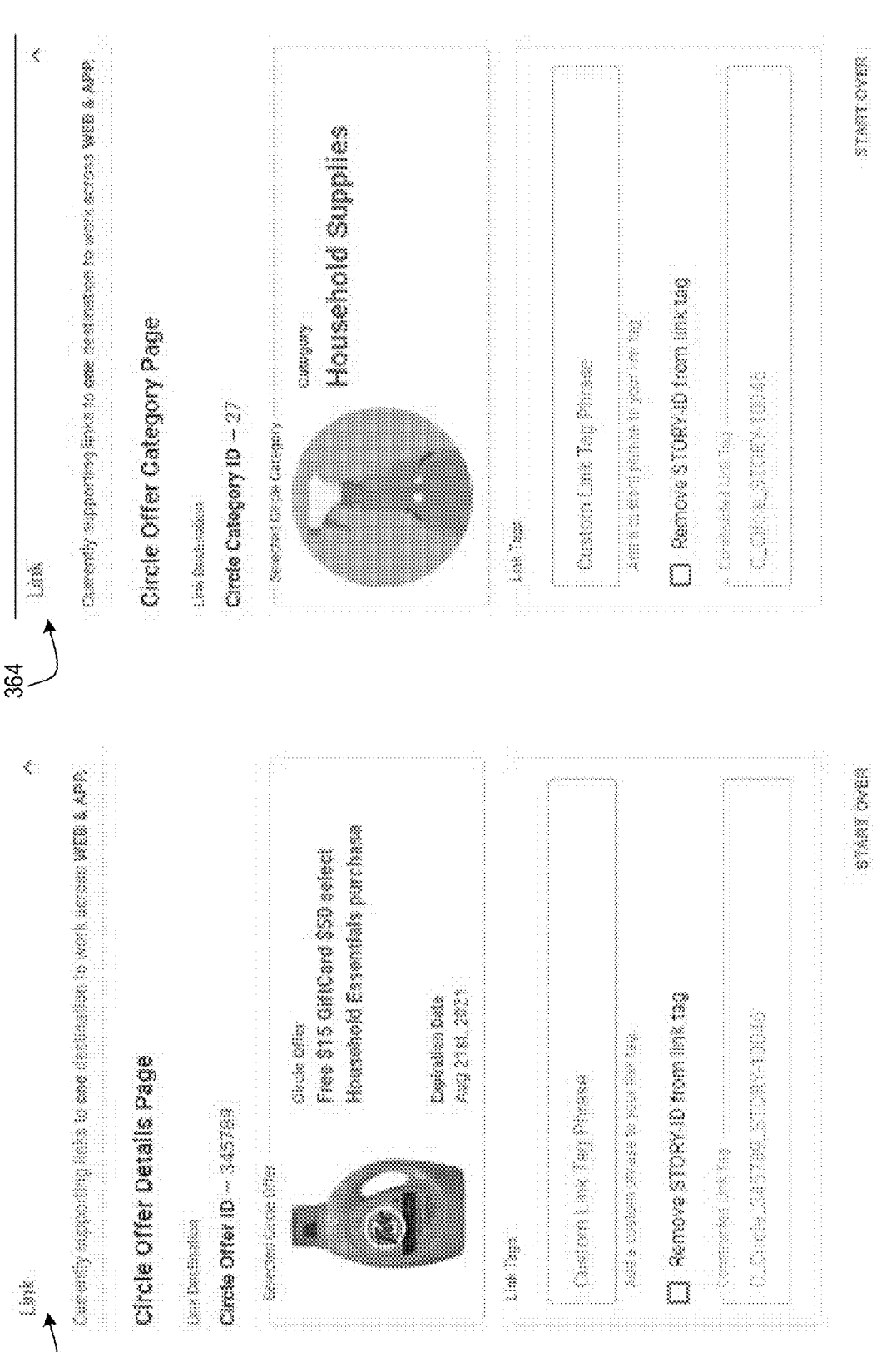

Moreover, as shown in the presentations 354A-N, a type styling control can be automatically and visibly applied to text in the presentations 354A-N. These styles can use a predefined menu of formatting options and may or may not honor CSS shortcodes and/or overrides. Any of the text in the presentations 354A-N may be further formatted by the user using one or more formatting options presented in the GUI 330. However, a manner in which the text is displayed to the user in the GUI 330 can be based on whether the presentation 354A-N in which it is shown honors stylized and/or channel default type styling. This can be determined at a presentation level. Sometimes, this cannot be overridden by the user. The stylized type shown in the presentations 354A-N of the story 331 can advantageously allow flexibility in type size and/or placement. The stylized type can generally be reserved for presentations that integrate type and imagery into a unified space. In some implementations, channel default type may not honor type size and/or placement options, presenting text in a consistent manner across presentations in which the text is use. Generally, the channel default type can be honored/implemented when type and FIGS. 3D, 3E, and 3F illustrate example linking of stories that are edited and/or created using the disclosed techniques. Each story can support a single link across both web and application channels. All links in a content pool can leverage a data-validated link builder. Relevant information about a link, such as promotion start and end dates can be presented or provided back to a user in one or more GUIs once linking building operations begin. Sometimes, link tagging can be automated, with an ability to (optionally) add a custom link tag value to a story.

FIG. 3D presents example linking information 356 for a particular story in which the story can be linked to category, tag, and/or brand pages. These types of links can be sorted and faceted. In some implementations, facets can be filtered that are tied to a specific node identifier, while not limiting use of ghost facets. Ghost facets may not be visible to users, such as end users of a website.

When selecting links in the linking information 356, the user can define behavior of a resulting page that the story may be linked to. For example, the user can define whether the destination page should show one or more items/products, content, and/or both. An automated link builder can manage, for example, the different application behaviors on the web and application channels, and/or SEO scenarios that may limit what can and cannot be done (e.g., historical use of type=product).

Taxonomical searches can also be performed via page title lookup and/or direct entry of a node identifier in the linking information 356. Once a page and/or node identifier is defined, users can be presented with additional options to control a destination, including faceting, content, grid or mixed, sort, and/or custom link tag entries.

As shown in the linking information 356, the user can also select whether to link to content, grid, or mixed presentation for different channels (e.g., web, mobile app). Such linking selection may cause some content to be automatically hidden on a webpage through a URL parameter while causing the same content to be visible on a mobile application. Such linking selection can also allow the user to change behavior of content presentation and linking based on attributes associated with the channels. Therefore, content can be presented differently in each of the channels in a clean, intuitive, and user-friendly way.

FIG. 3E presents example linking information 358 for a particular story to be directly linked to product detail pages. FIG. 3E also presents example linking information 360 for a particular story to be directly linked to dynamic promotional listing pages. To link the story to a particular product page in the linking information 358, the user can provide input indicating a unique identifier for a particular product (e.g., TCIN).

The linking information 360 can be used to automatically generate product grid pages that may contain all or a subset of items/products within or having one or more promotions. The user can provide input such as a unique identifier/ identification number (e.g., promo ID) associated with a dynamic promotion listing page (DPLP) to link the story with the DPLP(s). The user can also have the option to facet this type of link and control a sort order of the items/ products presentation at the destination page. Once the user provides the promo ID in a GUI, the server system 102 can retrieve information about the associated DPLP and present the information in the GUI, such as the selected DPLP offer with one or more promotional names and/or promotional date ranges. Once The selected DPLP offer is presented, the user can provide additional inputs such as adding one or more facets, selecting one or more sorting options at the destination page, and/or entering one or more custom link tags.

FIG. 3F presents linking information 362 for a particular story to be linked to a particular offer details page. FIG. 3F also presents linking information 364 for a particular story to be linked to a particular offer category page. The user can provide as input a unique identifier associated with a particular offer to establish a linking according to the linking information 362 and/or 364. Once the user provides the identifier, information can be presented in a GUI to the user, which can be served by the server system 102, the information including, for example, the selected offer, an image associated with the offer and/or category, offer details, offer name, category name, and/or offer expiration date. Sometimes, the user can also provide input such as a custom link tag.

In some implementations, any of the information described and shown in FIGS. 3D-3F can be used to group two or more promotions/offers to then be combined and presented in a single destination page. The resulting destination page can, for example, be presented like a DPLP, but can pull in the items/products across all the provided/ identified promotions/offers. As a result, both web and application channels can link to a new, single page that includes items/products from the provided/identified promotions/offers. In comparison to links to category pages faceted by promotion type, grouped offer links can be traced back to one or more particular offer identifiers, which can benefit personalization of content delivery and analytics associated with the offers. In some implementations grouped offers may not have start and/or end dates. Sometimes, the page may load with no items/products if the page is being used in content that lives past the offer dates of one or more of the promotions/offers. Existing grouped offers can also be managed and/or adjusted at any time by one or more users (e.g., original creators of the grouped offers).

In yet some implementations, any of the information described and shown in FIGS. 3D-F can be used to link a particular story to one or more finds content. To link to a particular finds content, the user can provide input such as beginning to type a keyword. The server system 102 can then retrieve and serve all finds content having the keyword in a title and/or URL. The user can then select the one or more finds that they would like the story to link to. The server system 102 can, based on the selected finds content, present information about the selected finds content such as a thumbnail, image, title, link, and/or date range associated with the finds content.

Any of the information presented and described in FIGS. 3D-F can also be used to link the story to one or more content or other information that may be generated outside of the enterprise platform(s).

FIG. 3G illustrates example presentations of a story across different channels. As shown, presentation of the story can be automatically adjusted and served by the server system 102 based on presentation requirements of a desired channel. Creating a story can include providing, as input, one or more images in predefined image ratios for the different channels. For example, for mobile applications, the default predefined image ratio can be 1:1. For desktop and/or tablet channels, the default predefined image ratio can be 16:9. An optional override image ratio for desktop and/or tablet channels can be 5:2.

FIG. 3G shows a desktop and/or tablet channel presentation 366 and a mobile and application channel presentation 368. Accordingly, FIG. 3G shows a story 370 that has been automatically adapted for presentation in both the channel presentations 366 and 368.

Figure 3H:
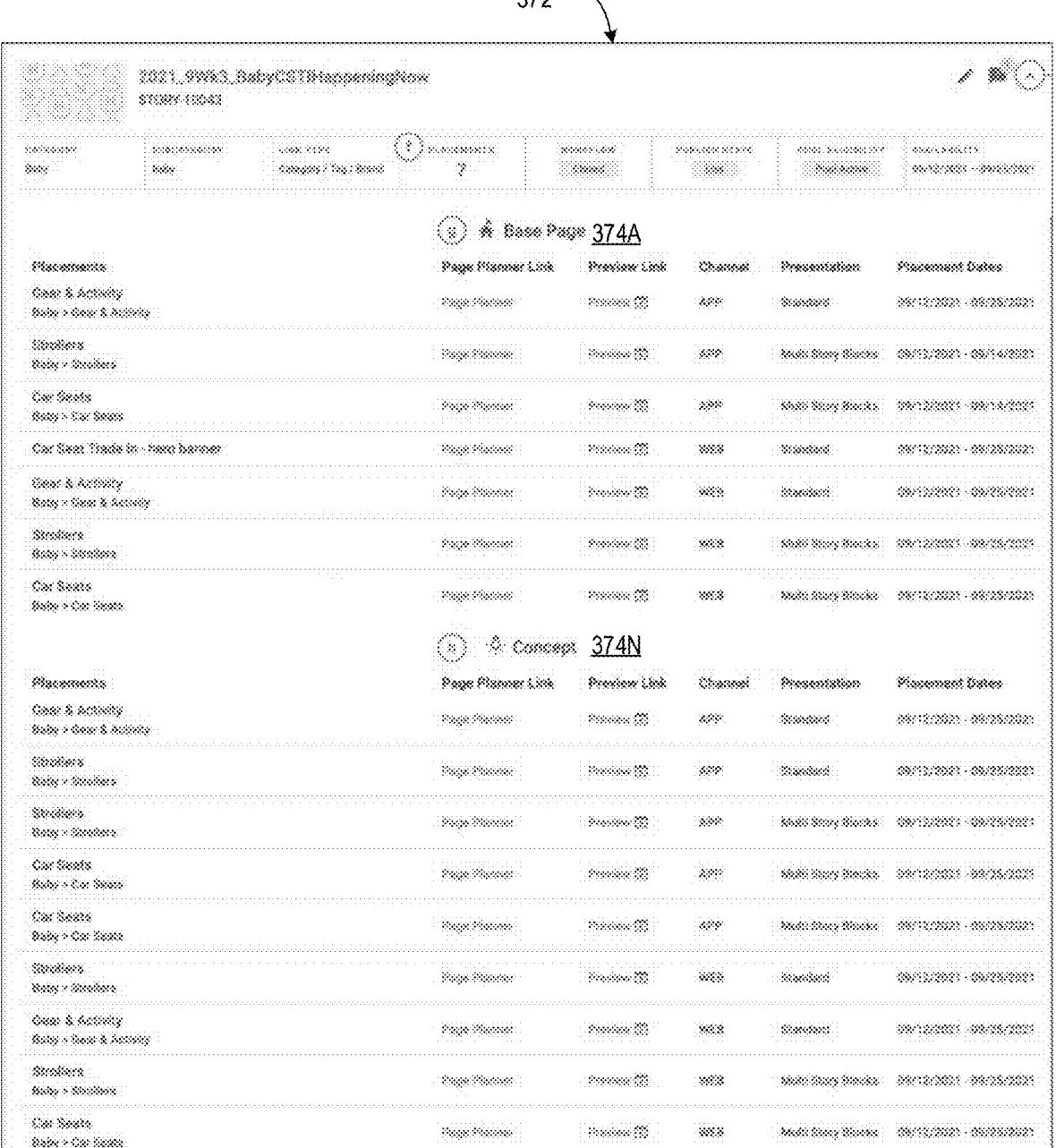
FIG. 3H illustrates an example listing of placements for a generated story.

FIG. 3H illustrates an example listing of placements for a generated story 372. A relevant user can select the story 372, which can be presented in a GUI such as the GUI 316 in FIG. 3B. Selecting the story 372 can cause additional information about the story 372 to be presented in a GUI. For example, the story 372 can be presented with placement information 374A-N. The placement information 374A can indicate a quantity of story placements on a base page (e.g., with links to one or more story placement pages). The placement information 374A can therefore indicate placements of the particular story 372 on a base page. The placement information 374N can indicate a quantity of story placements on a concept page.

FIG. 4 illustrates an example GUI 400 for editing and/or creating a page 401 from a page template 403 having predefined content slots 402A-N. The page template can enable a page structure that can execute dynamic and/or personalized content with ease, while also allowing manual deviation and/or modifications by one or more relevant users. Any of the slots 402A-N can be selected and expanded in the GUI 400 so that a user can provide inputs for further customization and/or modification of the page 401. The slots 402A-N can be filled with content, such as content entered manually by the user as input and/or stories described throughout this disclosure that may be pre-generated and stored in a data store (and/or associated with one or more content pools). The page template 403 can be designed and/or generated with specific, predefined placements of the slots 402A-N. Sometimes, the user generating the page 401 may not move the slots 402A-N to different positions/ placements in the page template 403. In some implementations, the user generating the page 401 may move one or more of the slots 402A-N to different placements in the page template 403 for the particular page 401. In yet some implementations, another user can modify the page template 403 itself, such as by adding or removing one or more of the slots 402A-N and/or changing the placement of one or more of the slots 402A-N. Once the modifications are made to the page template 403, the modified page template 403 can be dynamically presented in the GUI 400 and used by the user developing the page 401. As a result, the user can design the page 401 using the most recent, up-to-date version of the page template 403.

Figure 7A:
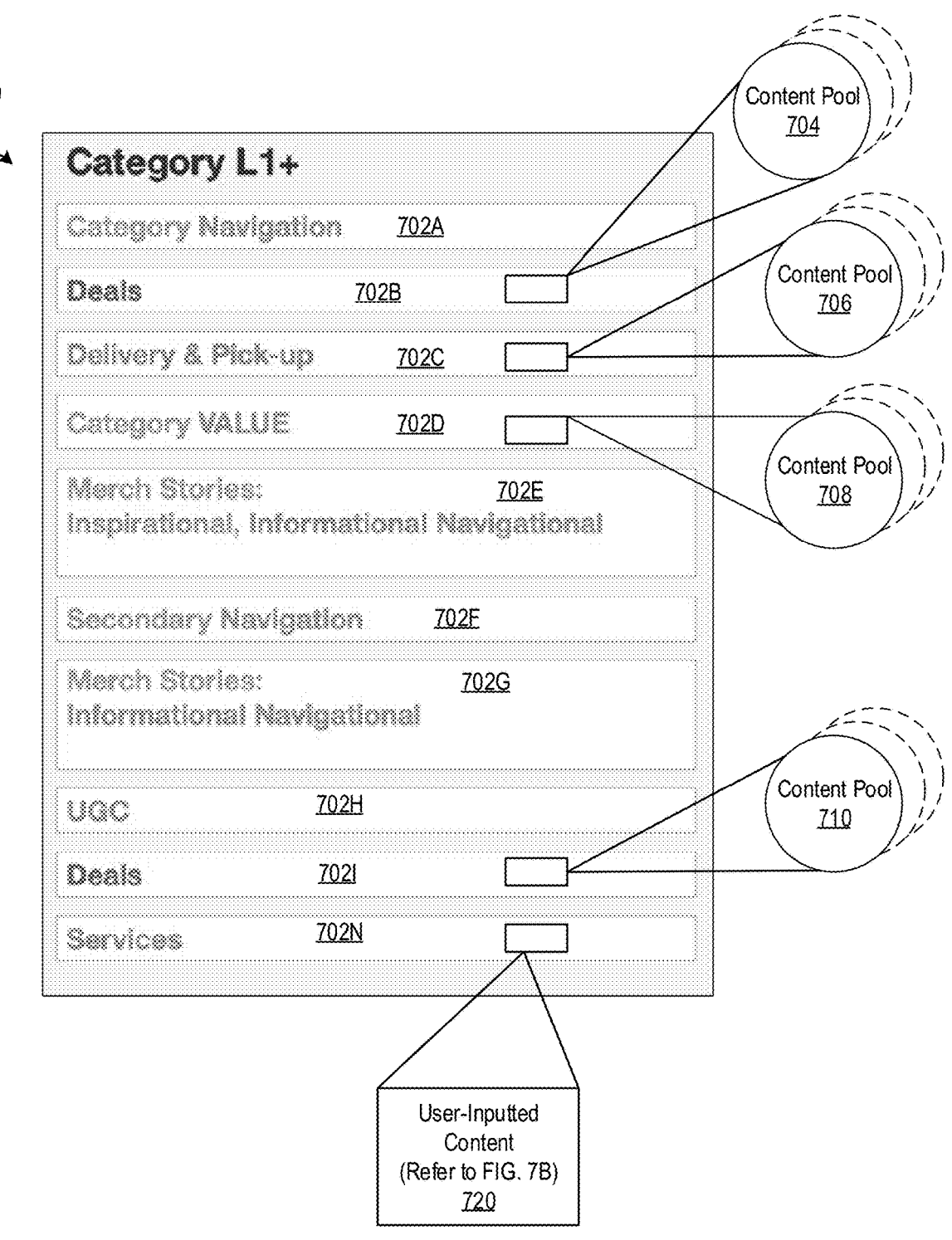
FIG. 7A illustrates an example page structure for a page template that can be used to generate different pages for an online retail environment or other type of online platform.
Figure 7B:
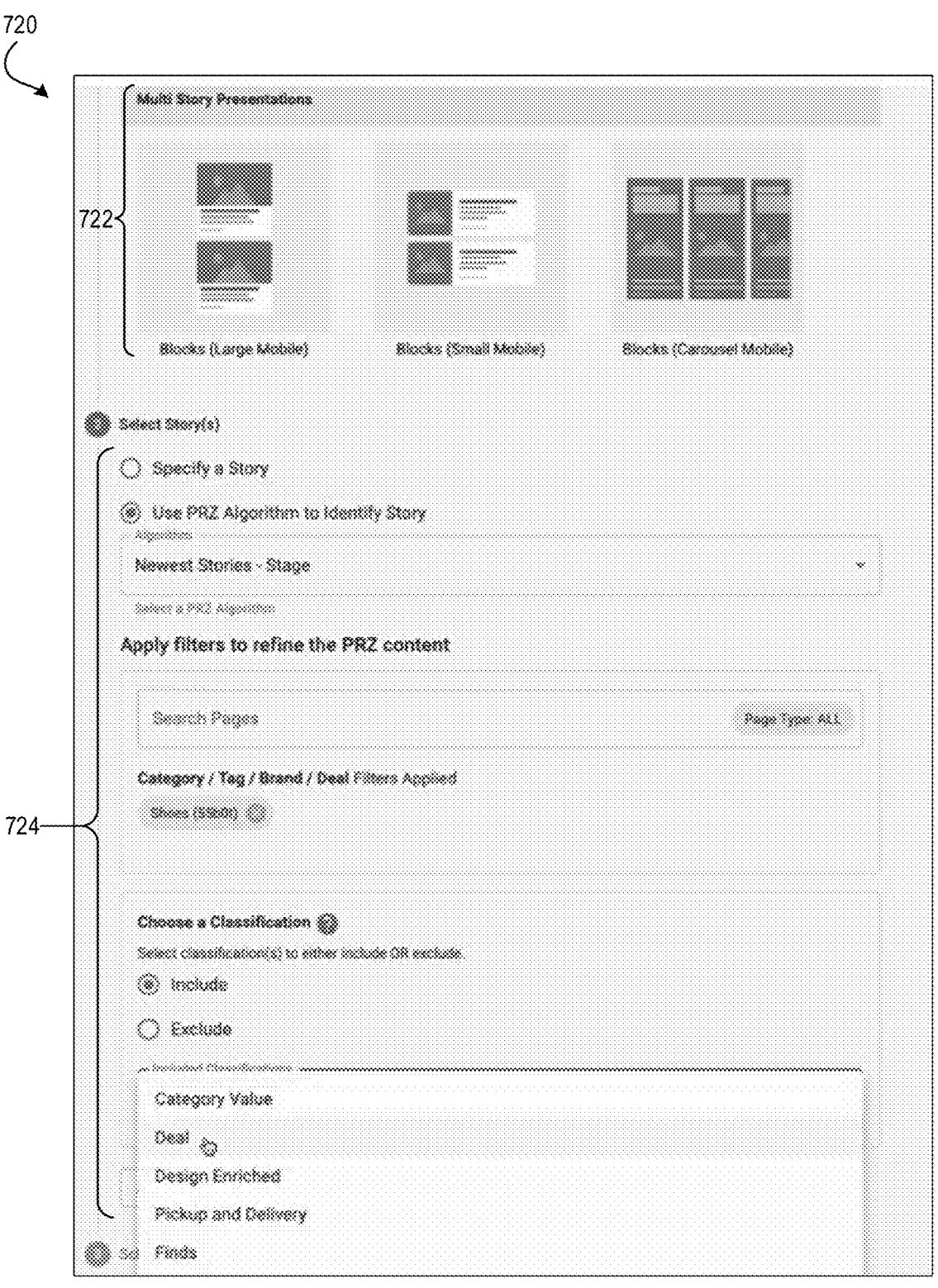
FIG. 7B illustrates an example template for a user to manually generate content for presentation in a page for an online retail environment or other type of online platform.

In the example GUI 400, each of the slots 402A-N can provide a different type of information. For example, slot 402A can provide navigational information, slot 402B can provide deals, slot 402C can provide deals recommendations, slot 402D can be an empty slot, which can be defined by the user, slot 402E can provide delivery and pickup information, slot 402F can provide recommendations information, slot 402G can provide category amplified value information, and slot 402N can provide merch story inspirational information. One or more other types of information may be provided by one or more of the slots 402A-N. The slots 402A, 402C, 402D, 402F, and 402N can be configured to allow the user to manually design/modify what information is presented and how the information is presented. Refer to FIG. 7B for further discussion about manually designing and/or modifying these types of slots. The slots 402B, 402E, and 402G can be configured to present content and, more specifically, predefined stories described throughout this disclosure. The slots 402B, 402E, and 402G can be automatically prepared and/or designed to include predefined information.

The slots 402B, 402E, and 402G can be visually presented in indicia (e.g., color, pattern, highlight, glow) that is different than indicia for visually presenting the slots 402A, 402C, 402D, 402F, and 402N. In addition, additional or fewer of the slots 402A-N can be similar to the slots 402B, 402E, and 402G, and additional or fewer of the slots 402A-N can be similar to the slots 402A, 402C, 402D, 402F, and 402N.

In the example GUI 400 of FIG. 4, the slot 402B is expanded to show information such as one of more filters 404, one or more classification tags 406, a qualifying stories indication 408, and a selectable option 410 to view the qualifying stories. The indication 408 identifies that 4 predefined stories qualify to be served and loaded into the deals slot 402B. The user can select the option 410 to view a list of the qualifying stories, such as the GUI 316 in FIG. 3B. The stories may only qualify for a predetermined amount of time, which can be determined by a user that generates each story and/or automatically by the server system 102. As a result, 4 stories may qualify at a current time for slot 402B, but in a day or two days after, additional, fewer, and/or different stories may qualify for the slot 402B.

The slot 402N is also expanded to show that a story having a story ID 16570 has been selected and will be presented at a position/placement in the page 401 that corresponds to the placement of the slot 402N in the page template 403. The slot 402N can show a thumbnail and/or preview of the selected story and other information such as a duration that the story will be presented (e.g., Apr. 2, 2023-Apr. 29, 2023), whether the story is closed (e.g., refer to FIG. 3C for further discussion), a presentation type/parameter(s) being used in the slot 402N, etc.

In some implementations, the user may not provide content to populate one or more of the slots 402A-N. Slots that do not contain content can be collapsed, which means they may not be presented when the corresponding page 401 goes live. There may be no requirements that all the slots 402A-N and/or a set of the slots 402A-N be filled with content or otherwise published when the page 401 goes live. Some pages, for example, may only have an item grid, and therefore may not include any slots in their respective page templates. Some pages at the bottom of the site taxonomy also may only have items or otherwise not include any of the slots 402A-N. The higher in the taxonomy, the more curated content and thus the more slots 402A-N may be available for receiving/presenting content. For example, at the top of the taxonomy is a home page, which may only have content (and thus a plurality of the slots 402A-N). Facets and taxonomy, as described herein, are also related and may impact how many slots 402A-N and/or what content is available for presentation in pages of the site.

FIG. 5 is a flowchart of a process 500 for generating stories and mini pools within a content pool. The process 500 can be performed by the server system 102. The process 500 can also be performed by one or more other computing systems, devices, computers, networks, cloud-based systems, and/or cloud-based services, such as a client device of a relevant user. For illustrative purposes, the process 500 is described from the perspective of a server system.

Referring to the process 500 in FIG. 5, the server system can generate a uniform page structure and hierarchy of page slots for use across different channels (block 502). Block 502 can be performed in response to receiving a user request for information. The user can request the uniform page structure with slots (e.g., a page template), which they can use to design and/or edit a page for the online platform. In some implementations, block 502 can be performed periodically or at predetermined time intervals. For example, the page structure and/or the hierarchy of page slots can be modified over time, by user input and/or automatically by the server system. Such modifications can be performed periodically or at the predetermined time intervals. The page structure and hierarchy can be designed so that when it is used to design any page, the page can be easily adapted and presented across the different channels (e.g., without requiring the page to be generated for each channel and/or without requiring the page to be stored/cached with different presentation requirements for the different channels. As described herein, the channels can include, but are not limited to, websites and/or applications for mobile, desktop, and/or tablet channel presentations. Refer to FIGS. 4 and 7A for further discussion about the page structure and hierarchy of page slots.

In block 504, the server system can receive generated stories and corresponding story attributes. The stories can be generated by one or more users in an enterprise, including but not limited to design teams and/or creative teams in the enterprise. In some implementations, the stories can be previously generated and stored, then one or more attributes of the stories can be modified, edited, and/or provided by users at their respective computing devices. Generating the stories with their attributes can enable such content to be reused and replicated across channels, regardless of presentation requirements of those channels (e.g., page layouts, configurations). Refer to FIGS. 2A, 3A, and 3C-3F for further discussion about generating the stories and their corresponding attributes.

The server system can add one or more of the stories to one or more mini pools in a content pool based on at least one of the corresponding story attributes (block 506). As described above, sometimes the server system can maintain a singular content pool and thus add the stories to the content pool. Then mini pools can be generated in the content pool that include sub-groups of stories that qualify for inclusion based on one or more filter criteria (e.g., classification, categorization, links, facets, other attributes associated with the mini pool). The server system can perform block 506 dynamically. In other words, the server system can perform block 506 in response to receiving a user request to view stories that are relevant for a particular slot and/or page that the user is developing and/or editing. Upon receiving the request, the server system can identify previously generated stories from a data store having story attributes that correspond to attributes or other information about the particular slot and/or the particular page. The server system can sort the identified stories into a mini pool and serve the mini pool to the user's computing device. As an illustrative example, the user can be creating a page for a pair of shoes for sale in an online retail environment. The user can be filling out a Deals slot on the page for the shoes. The server system can provide an indication to the user that some quantity of stories are available for use in the Deals slot. The user can select the indication, which can cause the server system to then identify all stories that are associated with sales or promotions on similar or same shoes (as an example), where those stories are resident in the singular general content pool, and group the identified stories into a mini pool. The server system can then serve that mini pool to the user's computing device. The user can select one or more of the stories in the served pool to be added into the Deals slot in the page they are developing for the shoes.

In some implementations, the server system can add the stories to the mini pools whenever the stories are made and/or edited. For example, the server system can identify mini pools and corresponding pool attributes, then identify previously generated stories that have story attributes corresponding to or otherwise having some relationship with the pool attributes, and add those identified stories to the respective mini pools. The server system can then automatically update the mini pools (e.g., periodically, at timed intervals, etc.) over time, based on modifying parameters of the pools and/or based on attributes of the stories that are previously generated and/or being generated. Refer to FIG. 2A for further discussion about the mini pools.

For each story in each mini pool, the server system can dynamically identify and label the story based on a corresponding content intent attribute (block 508). The content intent attribute can be determined automatically by the server system, which can analyze metadata associated with the story to glean insight about the intent of content being presented in the story. Analyzing the metadata can include applying one or more rulesets, algorithms, and/or machine learning models to the metadata to generate and identify associations between the analyzed metadata and various content intent categories/attributes.

For example, the content intent attribute can include, but is not limited to, deal content (block 510), category value content (block 512), delivery and pickup content (block 514), and/or design enriched content (block 516). The deal content attribute (block 510) can be used to classify and/or identify the story as being associated with sales, promotions, offers, or other types of deals in the online platform. The category value content attribute (block 512) can be used to classify and/or identify the story as providing value to a particular category of items available in the online platform. The delivery and pickup content attribute (block 514) can be used to classify and/or identify the story as being associated with options for delivering and/or picking up one or more items that are available for purchase in the online platform. One or more other content intent attributes can be defined, automatically by the server system and/or by one or more users of the enterprise, and used to further classify stories.

The server system can then return the page template, the stories and their corresponding story attributes, the mini pools, the content pool, and/or associations between the stories and the mini pools (block 518). Returning such information can include storing the information in a data store described herein. Returning such information can include presenting one or more of the information at one or more computing devices of relevant users. In some implementations, block 518 can be performed in response to receiving user input requesting one or more of the information described herein. Refer to FIGS. 3B, 3G, 3H, 4, 7A, 7B, and 8.

In some implementations, the process 500, or one or more blocks in the process 500, can be performed whenever a user requests information from the server system, such as when the user requests the page template to build a page for the online platform. As another example, the process 500 can be performed when the user requests to view a mini pool of stories that can be selected for designing a particular page for the online platform. As a result, the process 500 can be performed to dynamically generate the information requested by the user. The server system can be a front-end system that simply may retrieve cached information (e.g., story attributes such as images) and readily and efficiently serve that information to the user's device.

Sometimes, the process 500, or one or more blocks in the process 500, can be performed in response to receiving a user input indicating selection of a story in a returned mini pool. In response to receiving the user input, the server system can pull the cached story attributes for the selected story from local memory/storage and quickly and efficiently serve that pulled information to the user's computing device. Sometimes, the information for the selected story can be dynamically generated upon receiving the user input indicating selection of the story so that the information can be served quickly and efficiently to the requesting user's device.

FIGS. 6A and 6B is a flowchart of a process 600 for generating a page from a page template using predefined stories in one or more mini pools of a content pool. The process 600 can be performed by the server system 102. The process 600 can also be performed by one or more other computing systems, devices, computers, networks, cloud-based systems, and/or cloud-based services, such as a client device of a relevant user. For illustrative purposes, the process 600 is described from the perspective of a server system.

Referring to the process 600 in FIGS. 6A and 6B, the server system can receive a request to create a page for an online platform, such as an online shopping experience or online shopping/retail environment (block 602). A user can start or resume building the page in an enterprise platform. In response to receiving the request, the server system can identify a page template that has been generated for use in creating pages for the online platform.

In block 604, the server system can serve a page template with predefined slots for receiving content and/or other attributes for presentation in the page. Refer to FIGS. 4 and 7A for further discussion about the page template and the predefined slots. In some implementations, for example, the page template can be generated and dynamically modified based on a type of page. For example, a Deals page can have different predefined slots and template than an Item Category page.

The server system can optionally receive input indicating (i) a desired channel for presenting the page and/or (ii) a classification for the page (block 606). Sometimes, this input can be received before serving the page template in block 604. The desired channel can include, but is not limited to, mobile application, mobile web, desktop web, and/or tablet. One or more channels having different presented requirements/standards are also possible. Input indicating the desired channel can be used by the server system to appropriately and dynamically adapt any information provided in the page template for presentation in that desired channel. After all, any stories generated using the disclosed technology can be easily and readily adapted by the server system for presentation in any channel, regardless of what information is presented in the story and how the information is presented.

For example, the user can indicate that the page will be used in a mobile application. The user can select a story having an image with 4 products on sale to be presented in a particular slot of the page template. When serving that mobile application page, the server system can adjust a size or ratio of the user-selected image so that the image can be appropriately presented according to mobile application presentation standards/requirements (e.g., the image may be presented in a square arrangement since a mobile device has a narrow screen while the image may be presented in a stretched landscape arrangement for a desktop, which has a longer screen).

The input indicating the classification for the page can be used by the server system to dynamically generate and/or retrieve content pools of stories that can be applied to one or more slots in the page that is being created. For example, the user can provide input indicating that the page is a product page for a pair of high heel shoes. This information can then be used by the server system to identify stories that may relate to high heel shoes, similar products, and/or deals, promotions, or offers for the high heel shoes or other similar shoes (these identified stories can then be bucketized into a content pool and provided to the user at their device for selection).

The server system can receive input indicating selection of a slot amongst the predefined slots in block 608. Refer to at least FIG. 7A for further discussion about the slots.

In block 610, the server system can determine whether the selected slot has at least one corresponding content pool. The server system can determine whether one or more content pools have been generated in association with the particular slot. In scenarios where content pools are dynamically generated, such as in response to a request for stories by the user or another type of similar query, the server system can determine, based at least on the classification for the page, whether any stories stored in a data store are currently available and are relevant for the page and/or the particular slot. For example, the server system can compare and identify similar attributes between stories and the page being developed, etc., as described at least in reference to FIGS. 1, 2A, and 3A. The server system can perform other checks to determine whether the particular slot and one or more stories have a mapping of the page classification and/or attributes corresponding to the slot and the stories.

If the selected slot does not have at least one corresponding content pool (e.g., the slot is not associated with a content pool, no content pools have been generated for the slot, no stories share attributes with attributes of the slot, the slot has not been defined to receive and present content pools, etc.), then the server system can receive input indicating one or more content and/or attributes to presented in the selected slot (block 612). The user can provide input to customize how and what information is presented in the selected slot. Refer to FIG. 7B for further discussion about customizing the selected slot with user input.

The server system can then serve the page according to the page template with the inputted content/attributes presented in the selected slot and based on the input indicating the desired channel for the page (block 614). The server system can serve the page to the user's computing device. Sometimes, the server system can serve the page to one or more end users (e.g., consumers) who are accessing the particular page in the mobile application. In some implementations, even if the user developed the page for the mobile application, end users can access the page from a desktop and/or tablet, which can cause the server system to dynamically adapt the page for presentation at the desktop and/or tablet and then serve the dynamically adapted page to the end users. As described throughout this disclosure, the disclosed technology beneficially provides for dynamically adapting content that is generated/created once for presentation across different channels.

If the selected slot has at least one corresponding content pool in block 610, the server system can optionally dynamically generate the content pool(s) (block 615) and/or proceed to block 616, in which the server system can optionally access the content pool(s) having predefined stories. Block 615 can be performed if the content pool(s) is not yet created but the server system identified that one or more stories have a mapping of attributes with the particular slot and/or the page being developed.

Dynamically generating the content pool in block 615 can beneficially use less processing power, compute resources, and/or storage/memory than generating the content pools, storing them, and accessing them at a later time. Dynamically generating the content pool in block 615 can also be beneficial to deal with ever-changing stories and their availability.

For example, some stories may be available for extended periods of time or short periods of time. A story can be added to a content pool on one day, and the next day (or even several hours after being added to the content pool), the story may no longer be available. Thus, the content pool would have to be updated by removing the story from the pool once the story is no longer available. Similarly, one or more attributes of the story can be modified after the story has been added to the content pool. The modifications may cause the story to no longer be relevant for the content pool, so the content pool would have to be updated by removing the story from the pool. As another example, whenever stories are generated or modified and they have a mapping with attributes or parameters of the content pool, the content pool would have to be updated to include those stories. The above examples can utilize more processing power and compute resources (e.g., memory, storage, RAM) than if the content pool is simply dynamically generated in block 615 during runtime creating of the page. Dynamically generating the content pool in block 615 can allow for, at a particular time that the page is being developed, the server system to use minimal processing power and other compute resources to quickly and efficiently identify all relevant stories and group them into the content pool, then server the content pool to the user's device.

Block 616 can additionally or alternatively be performed to access the content pool(s) having a mapping with the particular slot in the page template. The server system can previously generate the content pool(s). For example, the content pool(s) can be dynamically generated in block 610, when the server system determines whether the selected slot is associated with one or more content pools. Sometimes, the relevant content pool(s) can be previously generated then dynamically updated during the runtime generation of the user's page. For example, the content pool can be created with stories having similar, same, and/or corresponding attributes, then stored in a data store. In the process 600, such as at blocks 610, 615, and/or 616, the server system can dynamically update the content pool to ensure that all the stories therein are relevant to the particular slot, the page being developed, the classification of the page, and/or other attributes in the page. Then the updated content pool can be readily served to the user's device. Refer to FIGS. 2A and 2B for further discussion about dynamically generating and/or updating content pools.

The server system can return the predefined stories of the accessed content pool(s) in block 618. As described throughout this disclosure, the server system can serve only the relevant stories for the page and/or particular slot, which correspond to the content pool(s). The stories can be presented in a GUI at the user's device, as described further in reference to at least FIGS. 3B, 3H, and 9.

In block 620, the server system can receive input indicating selection of a story from the predefined stories. As described further in reference to FIGS. 3B and 3H, the user can select one of the presented stories to add to the predefined slot in the page they are developing. In some implementations, the user can select one of the presented stories and further modify content and/or attributes of that story.

Optionally, the server system can receive input indicating one or more modifications to attributes or other information corresponding to the selected story for presentation in the selected slot in the page (block 622). The modified story can then be stored in the data store. Then the modified story can be used by other users and/or in other pages. In some implementations, the modified story can be used for the particular slot in the page, but may not be stored in the data store. In other words, the story may only be modified for use in the particular page. Refer to at least FIGS. 3C-3F for further discussion about modifying a story.

The server system can serve the page according to the page template with the selected story presented in the selected slot and based on the input indicating the desired channel for the page (block 624). For example, the server system can present or transmit the page as developed by the user and according to all of the user inputs at the user's computing device. The server system can transmit, to the user's device, cached data for the page template, the selected story for the particular slot, and the other user inputs and then the user's computing device can server the page according to the cached data. As a result, the page can be quickly and efficiently served to the user's computing device. Similarly, the page and/or the cached data can be served to computing devices of one or more end users who access and/or request the page when interacting with the online platform.

FIG. 7A illustrates an example page structure 700 for a page template that can be used to generate different pages for an online retail environment or other type of online platform. As described throughout this disclosure, pages across a website and/or application can adopt the common page structure 700 having a common hierarchy for presenting content, as indicated by slots 702A-N. One or more of the slots 702A-N can be designed and/or created to present stories from one or more content pools. As merely illustrative examples, the deals slot 702B can be configured to present one or more stories from content pool(s) 704, the delivery and pickup slot 702C can be configured to present one or more stories from content pool(s) 706, the category value slot 702D can be configured to present one or more stories from content pool(s) 708, and the deals slot 702I can be configured to present one or more stories from content pool(s) 710. For any of the slots 702B, 702C, 702D, and 702I, the user can select one or more stories for presentation therein. As described in reference to FIG. 4, additional, fewer, or other slots can be configured to present stories from one or more content pools. One or more of the slots 702A-N, such as the services slot 702N can be configured to receive user-inputted content 720, as described further below in reference to FIG. 7B.

The page structure 700 of FIG. 7A illustrates an example hierarchy of slots as follows from top to bottom of the page structure 700: category navigation, deals, delivery and pickup, category value, merch stories including inspirational, informational, and/or navigational, secondary navigation, merch stories including informational and/or navigational, user generated content (UGC, such as content generated by product teams, socially-based content, or other content generated by end users, such as selfies, videos, or other information provided by the end users), deals, and lastly services. The page structure 700 is merely illustrative. One or more other hierarchies of the slots 702A-N, quantity of the slots 702A-N, and/or selection of the slots 702A-N can be determined for the page structure 700. As another illustrative example, an hierarchy of slots can be as follows from top to bottom of the page structure 700: global message, page title, navigation, personalized products recommendations, specialized component type navigation, deals (which can be configured to present stories from content pools), personalized deals, delivery and pickup information (which can be configured to present stories from content pools), personalized products recommendations, category value information (which can be configured to present stories from content pools), inspirational merch stories, personalized products recommendations, inspirational merch stories, informational merch stories, personalized products recommendations, optional headline(s), informational merch stories, remaining navigation, Roundel DFP content, a headline, an informational merch story, a brand navigation, user-generated content, one or more deals (which can be configured to present stories from content pools), product-based deals as personalized recommendations, offers/promotions for a particular end user, a headline, services information, features information, benefits information, a product grid, user-generated content in a product grid, and lastly search engine optimization information. In such an example, the page structure 700 can include 11 slots for inspirational and/or informational content types, 4 slots for headlines, 4 slots for navigation, 4 slots for deals, 6 slots for personalized recommendations, 3 slots for specialized content, and 4 slots for reserved content. One or more other hierarchies and/or quantities of slots are also possible for the page structure 700.

FIG. 7B illustrates an example template 720 for a user to manually generate content for presentation in a page for an online retail environment or other type of online platform. The template 720 allows the user to manually enter what information they desire to present in a particular slot in the page, rather than selecting one or more predefined stories from a content pool for presentation in the slot in the page. Using the template 720, the user can provide inputs to define how the particular slot can be presented and what information may be presented in the particular slot.

The template 720 can include selectable multi-story presentation options 722. The template 720 can also include selectable story options 724. Using the options 724, the user can provide input indicating a specific story to present in the particular slot. Using the options 724, the user can select a personalization algorithm that can be executed by the server system 102 to identify a best story to present in the particular slot for a particular end consumer. Using the options 724, the user can provide input indicating one or more filters for refining content presented in the particular slot, such as personalized content for a particular end consumer. The filters can include taxonomy, such as a category, tag(s), brand(s), and/or deal(s). Using the options 724, the user can provide input indicating one or more included or excluded classifications for information that can be presented in the particular slot.

Figure 8:
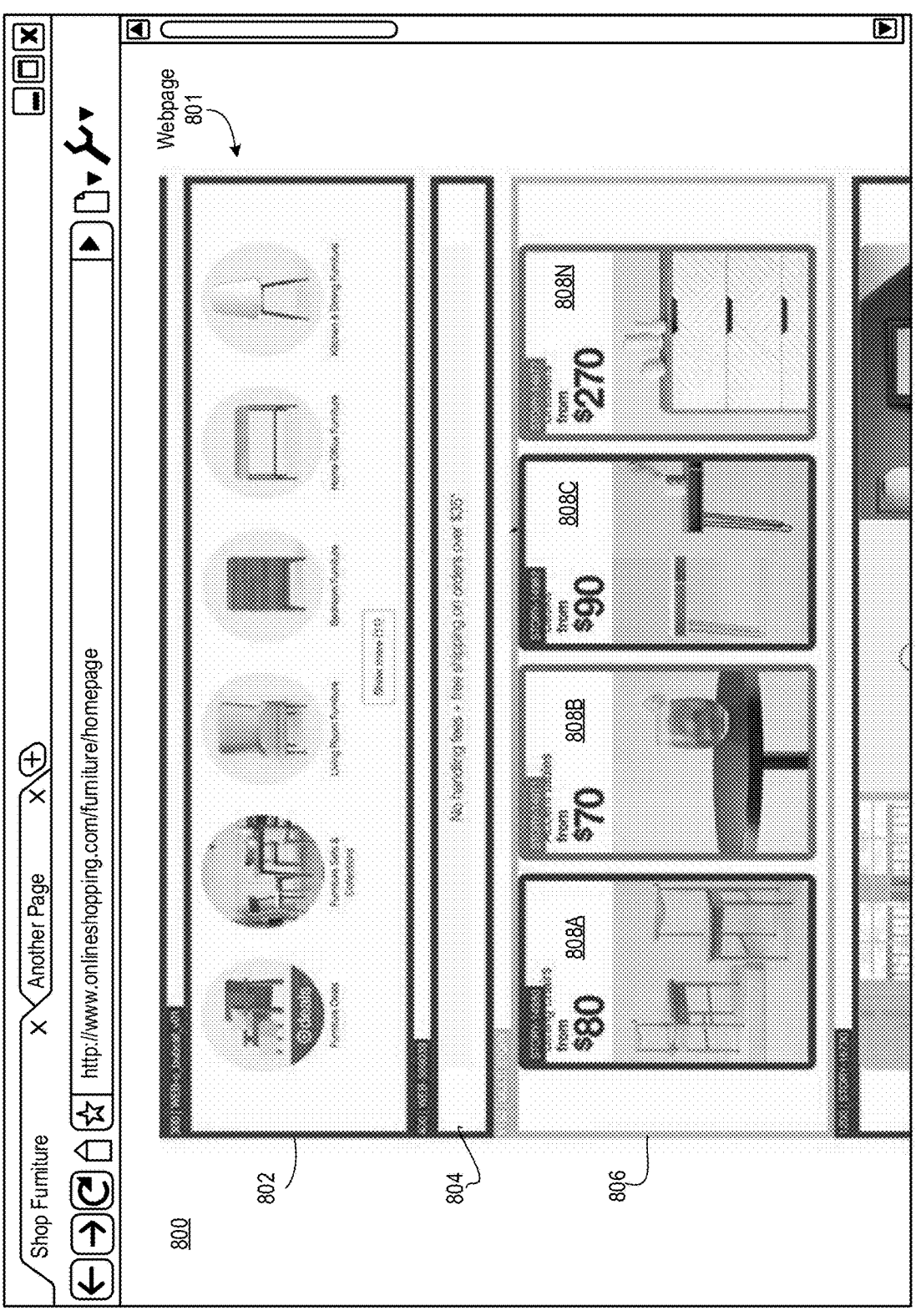
FIG. 8 illustrates an example GUI presenting different predefined slots in a webpage.

FIG. 8 illustrates an example GUI 800 presenting different predefined slots in a webpage 801. The GUI 800 can be presented at a relevant user's computing device, such as a content creator. The GUI 800 can allow the user to easily visualize how content can or is presented in the webpage 801.

The webpage 801 can be a furniture homepage in an online retail environment. The webpage 801 can be broken up into a plurality of slots 802, 804, 806, etc. Each of the slots 802, 804, and 806 can be predefined slots in a page template. As described throughout this disclosure, the page template can be used for designing all different pages in the online retail environment, not just the particular webpage 801. However, content that goes into one or more of the slots 802, 804, and 806 can be uniquely defined and/or created by a relevant user. In addition, although the page template may include all the slots 802, 804, 806, etc., the user can determine which slots they desire to use when developing their particular page.

In the example GUI 800 of FIG. 8, the slots 802, 804, and 806 have been defined with content using the disclosed techniques. Each of the slots 802, 804, and 806 can be considered a container to provide uniform formatting and/or layout of information across pages in the online retail environment, which beneficially can enhance end users' experience and user-friendliness of the online retail environment.

The slot 802 can receive and display stories or other content based on the site taxonomy. For example, the GUI 800 can be a homepage or landing page for furniture. The slot 802 can be configured to receive and display content for pages that are hierarchically arranged in the taxonomy beneath the homepage or landing page for furniture. In the example of FIG. 8, the slot 802 can be populated with content (e.g., links) to pages for deals, furniture sets and collections, living room furniture, bedroom furniture, etc. The users described herein may not manually select or identify what content populates the slot 802. Rather, the server system 102 described herein can automatically populate the slot 802 with content corresponding to the next pages in the taxonomy following the homepage or landing page for furniture.

The slot 806 is labeled as a multi-story container because it can be used to present a plurality of stories 808A-N. Any of the stories 808A-N can be manually selected by a user generating and/or updating the GUI 800. Any of the stories 808A-N may be automatically selected by the server system 102 using one or more selection rules and/or algorithms. For example, the server system 102 can automatically select any of the stories 808A-N based on default selection criteria, such as classification, categorization, presentation, etc. As another example, the server system 102 can implement a personalization algorithm that is configured to automatically select any of the stories 808A-N that are similar to preferences and other actions of particular end users interacting with the online retail environment. The stories 808A-N can also be selected using any combination of manual selection and computer-automated selection. One or more other slots can also be labeled as multi-story or story containers, which means they are designated for presenting the stories described throughout this disclosure. Stories can therefore be presented on their own as single story presentations or alongside other stories as multi-story presentations. Single story presentations can include one next-click link to direct an end user to a relevant page and/or product for sale in the online retail environment. With multi-story presentations, each of the presented stories can be linked to one or more relevant pages and/or products in the online retail environment.

Slots that can be used to present stories, such as the slot 806, can be populated with predefined stories that are part of designated content pools, regardless of whether those predefined stories have been developed for a particular channel of presentation (e.g., the webpage 801 for a desktop web or a mobile web and/or a mobile application). As described herein, the same content (e.g., stories) can be generated once and then used across different slots, pages, and/or channels for presentation without requiring to generate the content multiple times to comply with presentation requirements of those slots, pages, and/or channels. As described herein, each story can be required to have at least one image ratio, which can ensure that all presentation types can be available to use when placing a story (e.g., as a single story and/or in a multi-story presentation). Story images must meet the image ratio requirement, however the images may not need to meet suggested dimensions. Any image dimension that satisfies the image ratio requirement can be accepted.

As described in the process 600 in FIGS. 6A and 6B, the user can request and/or access mini pools that are associated with the slots 806 and 808A-N. The user can then select one or more predefined stories from the content pools for presentation in each of the slots 806 and 808A-N. If desired, the user may also edit or modify one or more of the selected predefined stories for presentation in one or more of the slots 806 and 808A-N.

The slots 802 and 804 are labeled as web containers because they can receive web content or other content that may not be personalized or customized. For example, content presented in the slots 802 and 804 can be the same across multiple pages of the online retail environment. Such content can include navigational buttons or graphical elements, information about delivery, pickup, and/or shipping, and/or other information that can apply to or otherwise be relevant for multiple pages of the online retail environment.

Figure 9:
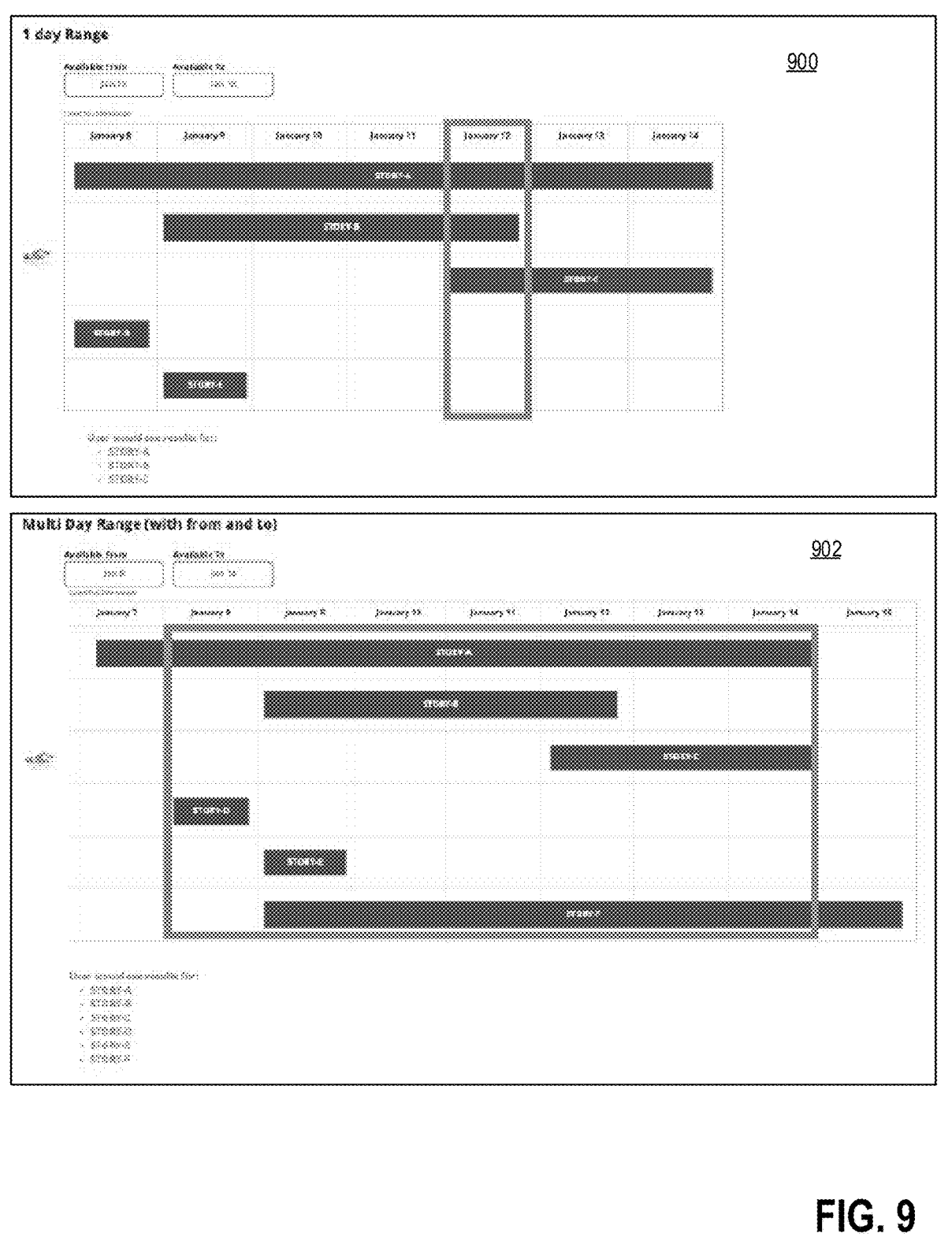

FIG. 9 illustrates example GUIs 900 and 902 for viewing available stories. Stories displayed in the GUIs 900 and 902 can be filtered by a relevant user. Any of the filters described herein (e.g., refer to FIG. 3B) can be used and applied. In the example GUIs 900 and 902, the user has filtered story availability based on dates that the stores are available. In the GUI 900, the stories have been filtered based on a single day range of availability. In the GUI 902, the stories have been filtered based on a multi-day range of availability. The user can apply and/or add any saved filters. The user can search within the filtered results and/or within available dates. The user can select any of the stories presented in the GUIs 900 and 902 to view additional information about the selected story (e.g., refer to FIGS. 3C and 3H). In some implementations, the user can view the stories presented in the GUIs 900 and 902 in tables or other presentations, such as the GUI 316 presented and described in reference to FIG. 3B.

Figure 10:
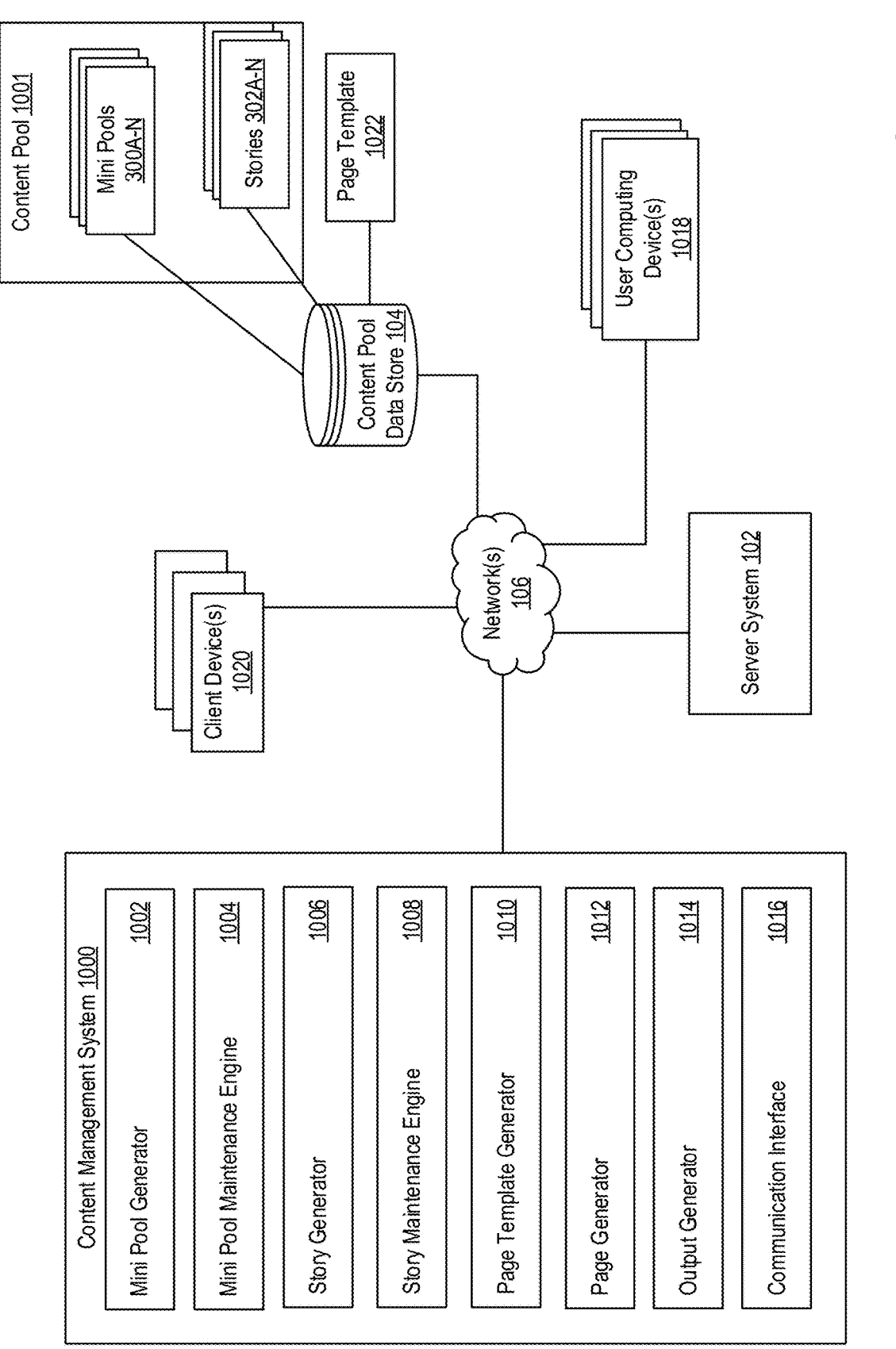
FIG. 10 is a system diagram of components that can be used to perform the disclosed techniques.

FIG. 10 is a system diagram of components that can be used to perform the disclosed techniques. The server system 102, content pool data store 104, content management system 1000, user computing device(s) 1018, and client device(s) 1020 can communicate (e.g., wired, wirelessly) via the network(s) 106. The server system 102 can be any type of web server or other computing system described throughout this disclosure. The content management system 1000 can be any type of computing system described herein, that can be configured to perform the disclosed techniques (e.g., generate page templates, generate and/or update stories, generate and/or update content pools, generate pages based on user inputs from the user computing devices 1018). In some implementations, the content management system 1000 can be the same as the server system 102. The content management system 1000 can also be configured to serve content to relevant users, such as serving the generated stories, content pools, and/or page template to the user computing devices 1018 and/or serving the generated pages to end users at the requesting client devices 1020.

The content management system 1000 can include a mini pool generator 1002, a mini pool maintenance engine 1004, a story generator 1006, a story maintenance engine 1008, a page template generator 1010, a page generator 1012, an output generator 1014, and/or a communication interface 1016. The communication interface 1016 can be configured to provide communication between components of the content management system 1000 and the other system components described in FIG. 10.

The mini pool generator 1002 can be configured to dynamically generate mini pools 300A-N, such as in response to a request for stories from the user computing devices 1018. The mini pools can also be dynamically generated in response to receiving a query for relevant stories for a particular page that is being developed at the user computing devices 1018. In some implementations, the mini pools can be generated, stored in the content pool data store 104 as the mini pools 300A-N, and then dynamically modified over time. As described herein, the mini pool generator 1002 can be configured to maintain a singular content pool 1001.

The mini pool maintenance engine 1004 can be configured to modify the mini pools 300A-N, their parameters and/or attributes, and/or which of the stories 302A-N are added to or removed from the mini pools 300A-N. In some implementations, the engine 1004 can be part of or the same as the mini pool generator 1002. Refer to at least FIGS. 2A and 2B for further discussion about generating and modifying the mini pools 300A-N.

The story generator 1006 can be configured to generate one or more of the stories 302A-N and store them in the data store 104. The generator 1006 can receive user input from the user computing devices 1018 indicating one or more attributes and/or content to be presented in the story when the story is selected for presentation in one or more pages of an online platform.

The story maintenance engine 1008 can be configured to update one or more of the stories 302A-N and store them in the data store 104. The engine 1008 can receive user input indicating one or more modifications to story attributes or other content. The modifications can be applied to a particular story only for a particular page, online retail environment, and/or presentation/channel. Sometimes, the modifications can be applied to the particular story and then stored in the data store 104 to ensure that the modified story is made available for future use by any other relevant users in designing their pages for the online platform or other online platforms. In some implementations, the engine 1008 can be part of or the same as the story generator 1006. Refer to at least FIGS. 2B, 3A, and 3C-G for further discussion about generating and modifying the stories 302A-N.

The page template generator 1010 can be configured to generate, update, and/or maintain a page template 1022. The page template 1022 can be stored in the data store 104 and accessed/retrieved by the page generator 1012 in response to a user at the user computing devices 1018 request for the page template 1022. The page template 1022 can be automatically and/or dynamically updated and/or modified over-time. The page template 1022 can be generated with predefined slots, as described throughout this disclosure. Any of the predefined slots can be modified over time, whether automatically and dynamically by the content management system 1000 or based on user input from the user computing devices 1018. Refer to at least FIG. 7A for further discussion about generating the page template 1022.

The page generator 1012 can be configured to generate a particular page for the online platform based on user input from the user computing devices 1018. The generator 1012 may also serve the page to the user computing device 1018 while the page is being dynamically generated so that the relevant user can review, modify, and create in real-time. The page generator 1012 can be configured to retrieve, access, or otherwise serve the relevant, timely, and/or available mini pools 300A-N and/or stories 302A-N to the user computing device 1018 for selection and inclusion in one or more of the predefined slots in the page template 1022 for the particular page. Refer at least to the process 600 in FIGS. 6A and 6B for further discussion about generating the particular page using the disclosed technology.

The output generator 1014 can be configured to generate any of the GUIs described throughout this disclosure. The output generator 1014 can then serve or otherwise transmit the generated GUIs to the user computing devices 1018. In some implementations, the output generator 1014 can be configured to generate GUIs to be presented at the client devices 1020, such as when the client device 1020 requests to view/present a particular page in an online retail environment.

The user computing devices 1018 can be any type of user device, computing device, mobile device, smartphone, mobile phone, laptop, tablet, and/or computer that can be used by content creators, designers, and/or others in an enterprise. The enterprise can provide online services to end users at their respective client devices 1020. The users of the user computing devices 1018 can create and/or modify content to be presented in an online platform for the online services provided by the enterprise. The GUIs described throughout this disclosure can be presented/displayed/outputted at the user computing devices 1018. The relevant users can provide user input (e.g., using keyboards, mice, microphones, speakers, touch screens) at the user computing devices 1018, which can be transmitted to the content management system 1000 and used by one of the respective components to generate and/or modify the content.

The client devices 1020 can be any type of user device, computing device, mobile device, smartphone, mobile phone, laptop, tablet, and/or computer that can be used by end users seeking to interact with the online platform of the enterprise. The client devices 1020 can be requesting devices that request pages of the online platform for presentation, display, and/or output. Each of the client devices 1020 can have different presentation standards and/or requirements. In other words, each of the client devices 1020 can provide a different channel, such as a mobile application, a mobile webpage, a desktop webpage, and/or a tablet webpage. When the client devices 1020 request the pages, the server system 102 and/or the content management system 100 can dynamically modify the requested pages for presentation according to the channel associated with the client device and then serve the modified pages.

Figure 11:
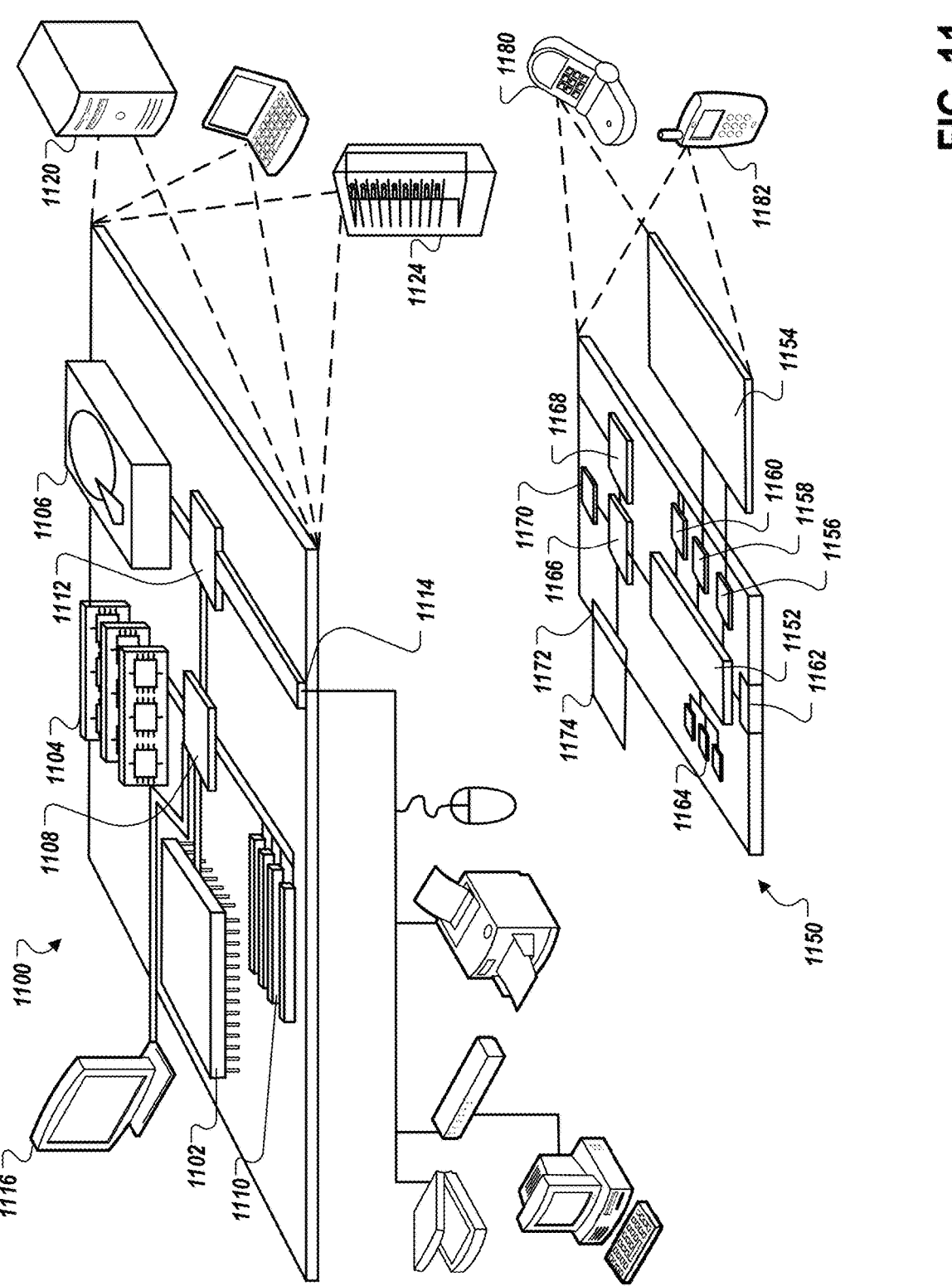
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer-or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation-and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for dynamically serving content for presentation across different channels, the system comprising:

a server system configured to:

provide to a client device, a page template for presentation in a graphical user interface (GUI) display, wherein the page template is used for generating a page in an online platform, wherein the page template comprises (i) predefined slots and (ii) parameters for presenting content in the predefined slots;

receive a request from the client device for a subset of a plurality of content elements, wherein the request designates a device interface type indicating a desired channel for presenting content in the page in the online platform using the page template;

dynamically generate the subset of content elements, wherein the dynamically generating comprises:

identifying each content element in the subset of content elements having a content attribute that satisfies one or more subset creation criteria, for each content element in the subset of content elements, dynamically adjusting presentation of a singular instance of the content element according to presentation requirements of the designated device interface type, selecting a portion of content elements in the subset of content elements that satisfy one or more presentation parameters, and removing another portion of content elements from the subset of content elements that do not satisfy the one or more presentation parameters; and serve the subset of content elements to the client device, wherein the served subset comprises the singular instances of the content elements that were dynamically adjusted according to the presentation requirements of the designated device interface type, wherein the singular instances of the content elements are selectable, by a user at the client device, for presentation in the slot in the page template used for generating the page in the online platform.

2. The system of claim 1, wherein identifying each content element in the subset of content elements comprises identifying the content element having a classification type that corresponds to a category identifier for the slot in the page template.

3. The system of claim 2, wherein the server system is further configured to: identify the classification type for the content element based on identifying where the content element lands in the online platform.

4. The system of claim 1, wherein the server system is further configured to:

receive user input from the client device indicating selection of a content element from the served subset of content elements; and replicate the selected content element for presentation in the slot in the page template when the page is served across any channel for presenting the content in the online platform.

5. The system of claim 1, wherein the one or more subset creation criteria comprise a personalization category, a link type, or a classification.

6. The system of claim 1, wherein each of the predefined slots are placed, by the server system, in predefined positions in the page template.

7. The system of claim 1, wherein the server system is configured to:

receive user input from the client device to move the slot to a different position in the page template relative to the other predefined slots; and move the slot to the different position in the page template based on the user input.

8. The system of claim 1, wherein the server system is configured to:

receive user input from the client device to add a slot to the predefined slots in the page template; and add the slot to the predefined slots in the page template based on the user input.

9. The system of claim 1, wherein the server system is configured to:

receive user input from the client device to remove a slot from the predefined slots in the page template; and remove the slot from the predefined slots in the page template based on the user input.

10. The system of claim 1, wherein the slot is an empty slot that can be defined by user input received at the client device.

11. The system of claim 1, wherein the server system is further configured to: transmit, to the client device, instructions to present, in the GUI, the slot in the page template, wherein presenting the slot in the GUI at the client device comprises expanding the slot in the GUI to include an indication of the served subset of content elements from which the user can select a content element for presentation in the slot when generating the page for the online platform.

12. The system of claim 1, wherein the server system is further configured to:

determine whether user input has been received from the client device to populate each of the predefined slots in the page template; and in response to determining that user input has not been received for populating at least one of the predefined slots in the page template, collapse the at least one of the predefined slots in the page template, wherein collapsing the at least one of the predefined slots in the page template causes the page in the online platform to be presented without the at least one of the predefined slots in the page template.

13. The system of claim 1, wherein the page template comprises a parameter for a slot amongst the predefined slots indicating that the slot is designated for presenting one story in the page template for generating the page in the online platform.

14. The system of claim 1, wherein the page template comprises a parameter for a slot amongst the predefined slots indicating that the slot is designated for presenting multiple stories at a time in the page template for generating the page in the online platform.

15. The system of claim 14, wherein each of the presented multiple stories comprise a link to an associated product in the online platform.

16. A method for dynamically serving content for presentation across different channels, the method comprising:

providing, to a client device, a page template for presentation in a GUI display, wherein the page template is used for generating a page in an online platform, wherein the page template comprises (i) predefined slots and (ii) parameters for presenting content in the predefined slots;

receiving a request from the client device for a subset of a plurality of content elements, wherein the request designates a device interface type indicating a desired channel for presenting content in the page in the online platform using the page template;

dynamically generating the subset of content elements, wherein the dynamically generating comprises:

identifying each content element in the subset of content elements having a content attribute that satisfies one or more subset creation criteria, for each content element in the subset of content elements, dynamically adjusting presentation of a singular instance of the content element according to presentation requirements of the designated device interface type, selecting a portion of content elements in the subset of content elements that satisfy one or more presentation parameters, and removing another portion of content elements from the subset of content elements that do not satisfy the one or more presentation parameters; and serving the subset of content elements to the client device, wherein the served subset comprises the singular instances of the content elements that were dynamically adjusted according to the presentation requirements of the designated device interface type, wherein the singular instances of the content elements are selectable, by a user at the client device, for presentation in the slot in the page template used for generating the page in the online platform.

17. The method of claim 16, wherein identifying each content element in the subset of content elements comprises identifying the content element having a classification type that corresponds to a category identifier for the slot in the page template.

18. The method of claim 16, wherein the method further comprises:

receiving user input from the client device indicating selection of a content element from the served subset of content elements; and replicating the selected content element for presentation in the slot in the page template when the page is served across any channel for presenting the content in the online platform.

19. The method of claim 16, wherein the method further comprises: transmitting, to the client device, instructions to present, in the GUI, the slot in the page template, wherein presenting the slot in the GUI at the client device comprises expanding the slot in the GUI to include an indication of the served subset of content elements from which the user can select a content element for presentation in the slot when generating the page for the online platform.

20. The method of claim 16, wherein the method further comprises:

determining whether user input has been received from the client device to populate each of the predefined slots in the page template; and in response to determining that user input has not been received for populating at least one of the predefined slots in the page template, collapsing the at least one of the predefined slots in the page template, wherein collapsing the at least one of the predefined slots in the page template causes the page in the online platform to be presented without the at least one of the predefined slots in the page template.

\* \* \* \* \*